(12) United States Patent
Dias et al.

(10) Patent No.: US 11,846,376 B2
(45) Date of Patent: Dec. 19, 2023

(54) SWAGE CONNECTOR DEVICE, ASSEMBLY AND METHOD

(71) Applicant: Quick Fitting Holding Company, LLC, East Providence, RI (US)

(72) Inventors: Libardo Ochoa Dias, West Warwick, RI (US); Herbert J. Bouchard, West Greenwich, RI (US)

(73) Assignee: Quick Fitting Holding Company, LLC, East Providence, RI (US)

( * ) Notice: Subject to any disclaimer, the term of this patent is extended or adjusted under 35 U.S.C. 154(b) by 35 days.

(21) Appl. No.: 17/587,475

(22) Filed: Jan. 28, 2022

(65) Prior Publication Data

US 2022/0364665 A1 Nov. 17, 2022

Related U.S. Application Data

(63) Continuation of application No. 17/321,798, filed on May 17, 2021, now Pat. No. 11,262,011.

(51) Int. Cl.
*F16L 37/091* (2006.01)
*F16L 19/06* (2006.01)

(52) U.S. Cl.
CPC .......... *F16L 37/0915* (2016.05); *F16L 19/061* (2013.01)

(58) Field of Classification Search
CPC ....... F16L 19/06; F16L 19/061; F16L 19/065; F16L 19/0656; F16L 19/045; F16L 37/091; F16L 37/0915; F16L 37/098; F16L 37/0982; F16L 37/122; F16L 37/1215; F16L 37/133; F16L 37/138; F16L 25/12

See application file for complete search history.

(56) References Cited

U.S. PATENT DOCUMENTS

| | | | |
|---|---|---|---|
| 6,450,553 B1 | 9/2002 | Suresh | |
| 9,574,691 B1 | 2/2017 | Crompton et al. | |
| 11,262,011 B1 | 3/2022 | Dias et al. | |
| 2006/0214420 A1 | 9/2006 | Mori et al. | |
| 2015/0233510 A1 | 8/2015 | Nezu | |
| 2019/0353286 A1* | 11/2019 | Kujawski, Jr. | ........ F16L 21/06 |

OTHER PUBLICATIONS

International Search Authority, International Search Report and Written Opinion for International Patent Application No. PCT/US22/27281, dated Aug. 16, 2022.

* cited by examiner

*Primary Examiner* — Aaron M Dunwoody
(74) *Attorney, Agent, or Firm* — Williams Muller; Thomas F. Bergert

(57) ABSTRACT

Embodiments of a swage connector device and assembly include one or more of a sealing ring, a fastening ring spreader, a retainer grip ring, a cap member and a fastener push ring. The fastener push ring moves axially and engages the fastening ring spreader in order to securely maintain a piping element held within the fitting.

13 Claims, 21 Drawing Sheets

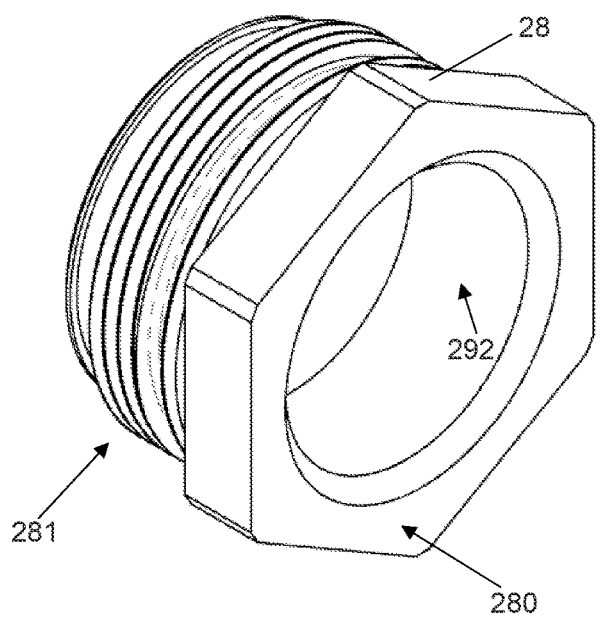
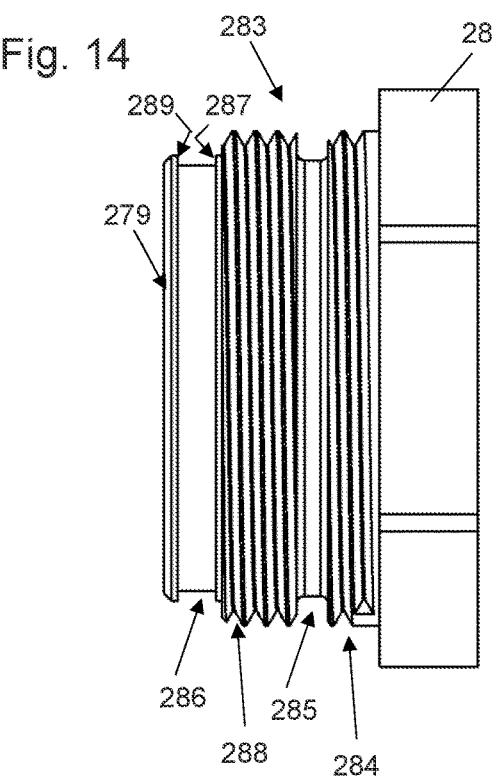
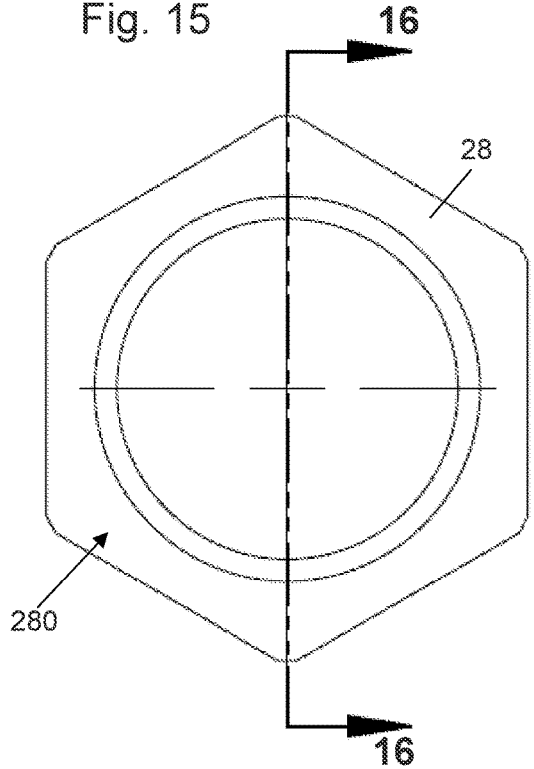
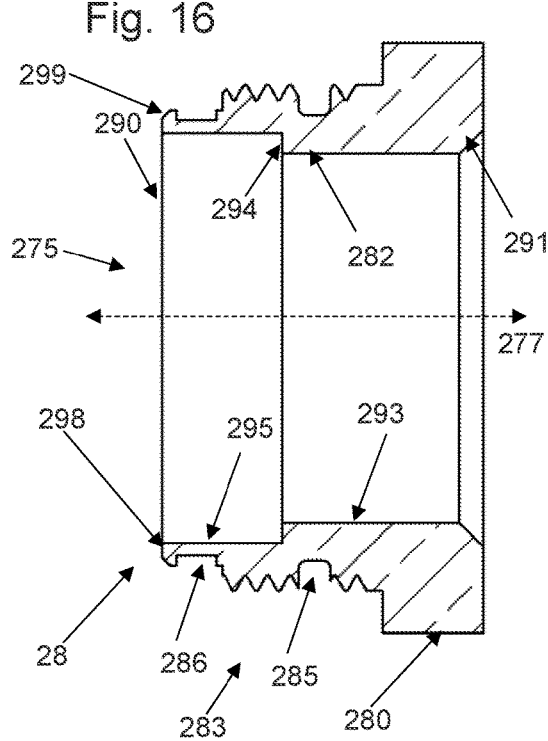

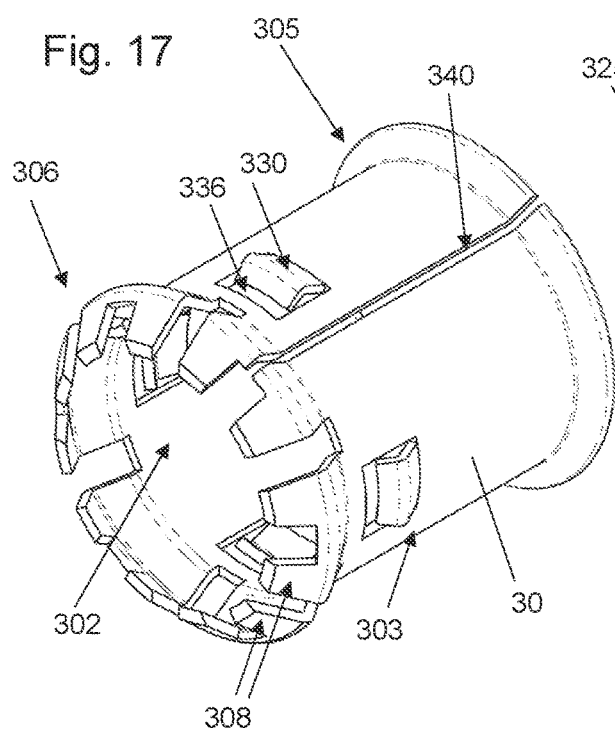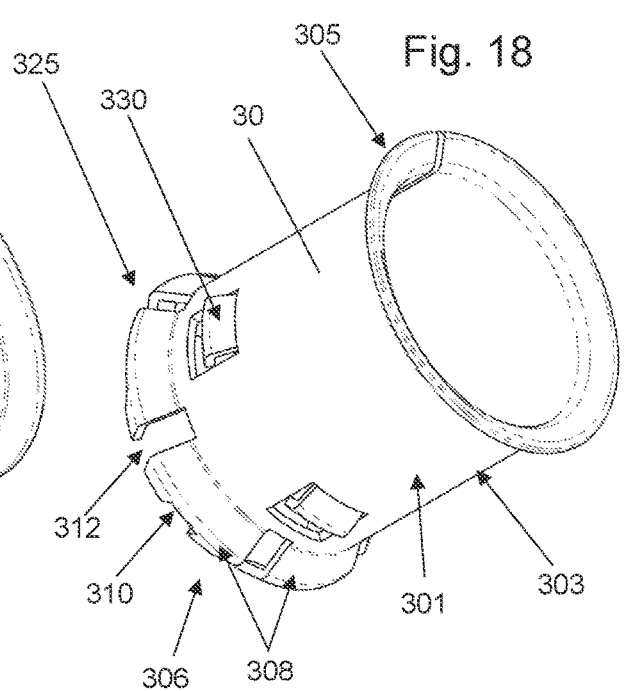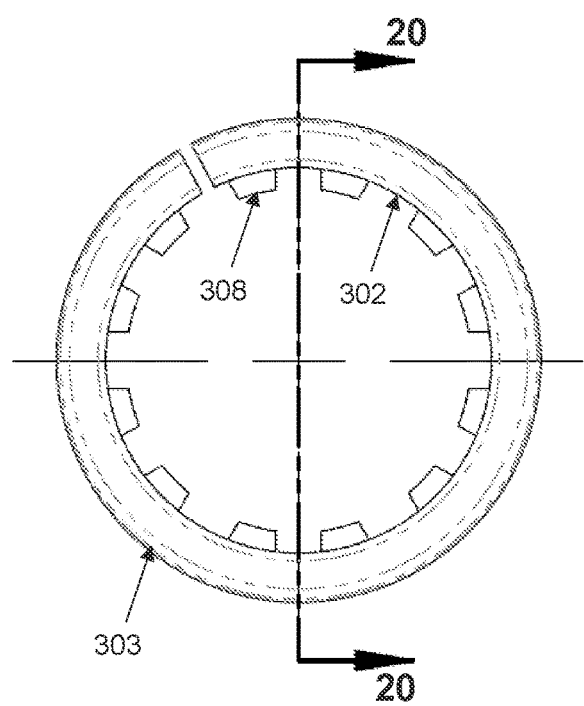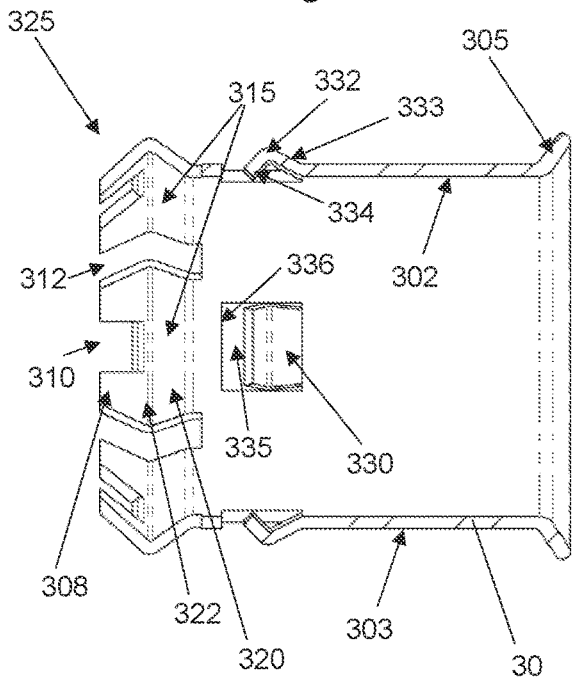

SWAGE CONNECTOR DEVICE, ASSEMBLY AND METHOD

CROSS-REFERENCE TO RELATED APPLICATIONS

The present application is a continuation of pending U.S. patent application Ser. No. 17/321,798, filed on May 17, 2021, which is hereby incorporated herein in its entirety by reference.

TECHNICAL FIELD

The present disclosure relates to fluid, refrigerant and gas flow systems, and more particularly to a push-to-connect joint assembly, device and method that facilitates the simple connection, disconnection, repair and re-use of piping and tubing system parts without welding, soldering or brazing.

BACKGROUND

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

For heating, ventilation and air conditioning (HVAC) environments, including HVAC deployments involving a central air conditioner, a service valve area can include various ports to facilitate various connections to the air conditioner unit. For example, refrigeration compressors often include a suction service valve and a discharge service valve. These are used to allow refrigeration gauges to be attached to the system and, in various designs, to isolate the compressor from the rest of the system. In many cases, service valves have a stepped or swaged profile and current connection techniques are not satisfactory.

In the past, pipe elements including pipes and HVAC service valves have been connected by brazing, welding and/or soldering them together using a torch. Brazing pipe fittings can be time-consuming, unsafe, and labor intensive. Brazing also requires employing numerous materials, such as copper pipes and fittings, emery cloths or pipe-cleaning brushes, flux, silver solder, a soldering torch and striker, a tubing cutter and safety glasses, for example. The process for brazing pipes can proceed by first preparing the pipe to be brazed, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out", i.e., meet flush inside the fitting. The tip of the solder can be bent to the size of the pipe in order to avoid over-brazing. With the pipes and fitting in place, the torch is then ignited with the striker or by an auto-strike mechanism to initiate brazing. After heating for a few moments, if the copper surface is hot enough such that it melts when touched by the end of the solder, the solder can then be applied to the joint seam so that it runs around the joint and bonds the pipe and fitting together. Once the joints are brazed, the systems can be cleaned and purged with an inert material.

In different environments, press connection of fittings around pipes and HVAC service valves has been employed, whereby a fitting is positioned around a pipe or service valve and a wrench, press gun or other pressure-applying device is used to press the fitting around the pipe or service valve. Such press connections result in permanent connections that cannot be undone without complete destruction of the connection and parts.

In recent years, push-fit technology has been employed with piping systems to reduce the dangers and time involved in brazing joints and to provide a connection that can be disassembled and/or undone. With push-fit connections, no wrenches, clamping, gluing, brazing or soldering is involved. Nevertheless, traditional push-fit connections are not well adapted for an environment with a stepped or swaged pipe profile as with many HVAC air conditioner service valve designs.

SUMMARY

The present disclosure provides, in part, a swage connector device, assembly and method that facilitates the re-use of push fittings without damage to the fitting internal elements, the fitting or the pipe. Embodiments of the present disclosure can be connected using no tools, clamps, brazing or glues, while creating a leak-free seal at the connected joining area.

Various embodiments of the present disclosure provide a swage connector assembly including one or more of a sealing ring, a fastening ring spreader, a retainer grip ring, a cap member and a fastener push ring.

Embodiments of the device and assembly provided as part of the present disclosure employ a fastener push ring that moves axially and engages the fastening ring spreader in order to securely maintain a piping element held within the fitting.

BRIEF DESCRIPTION OF THE DRAWINGS

FIG. 13 is a front perspective view of a cap member in accordance with embodiments of the present disclosure.

FIG. 14 is a front view of the cap member of FIG. 13.

FIG. 15 is a right side view of the cap member of FIG. 13.

FIG. 16 is a cross-sectional view of the cap member taken along the line 16-16 of FIG. 15.

FIG. 17 is a left front perspective view of a fastener push ring in accordance with embodiments of the present disclosure.

FIG. 18 is a right front perspective view of the fastener push ring of FIG. 17.

FIG. 18 is a front view of the fastener push ring of FIG. 17.

FIG. 19 is a left side view of the fastener push ring of FIG. 17.

FIG. 20 is a cross-sectional view of the fastener push ring taken along the line 20-20 of FIG. 19.

DETAILED DESCRIPTION OF THE PREFERRED EMBODIMENTS

Figure 1:
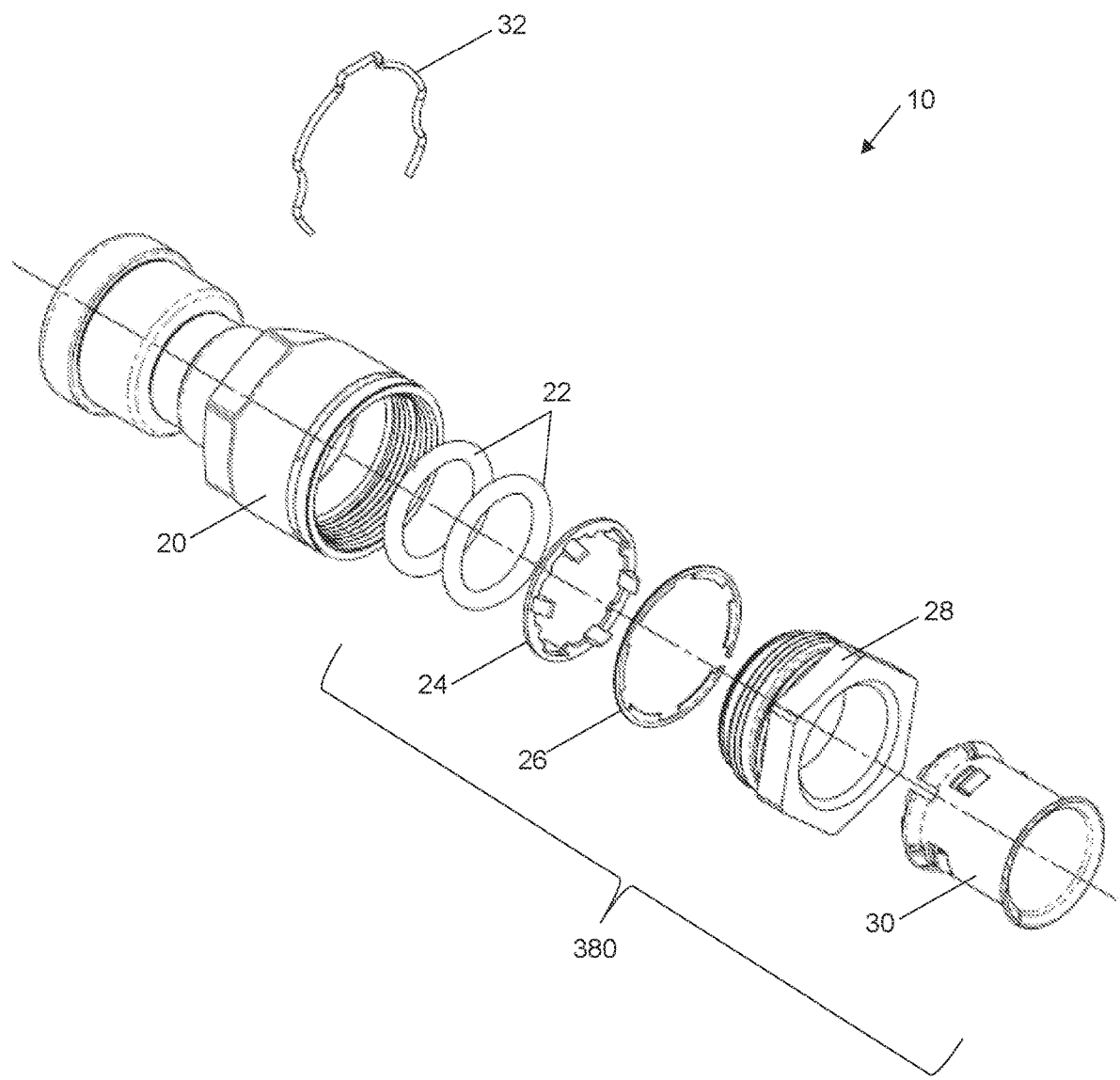
FIG. 1 is an exploded front perspective view of a swage connector assembly in accordance with embodiments of the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. Further, for purposes of the present disclosure, a fitting (also referred to as a fitting body, a body member or main body component) can encompass a valve member and other piping elements including, but not limited to: a coupling joint, an elbow joint, a tee joint, a stop end, a ball valve member, tubing and other objects having cylindrical openings.

In various embodiments, one or more sealing member gasket inserts (e.g., sealing ring members) fit within a sealing ring compartment defined in and/or machined into the interior surface of the fitting. In addition, at each pipe receiving end of the fitting, a pipe support compartment is machined into the interior to retain at least a portion of the packing arrangement. The fitting interior is formed to provide integrated support for the sealing member(s) and fastening ring when opposing force is applied to piping elements that have been inserted into the fitting. In various embodiments, a fastener push ring facilitates connection and disconnection of piping elements. Other methods, devices and arrangements associated with the present disclosure are described herein.

It will be appreciated that reference to "a", "an" or other indefinite article in the present disclosure encompasses one or more than one of the described element. Thus, for example, reference to a sealing ring may encompass one or more sealing rings, reference to a latch may encompass one or more latches, and so forth.

According to embodiments shown in FIGS. 1 through 42, a swage connector device 10 can be adapted for deployment with a swaged or stepped pipe 19, such as a pipe of a service valve 111 for an air conditioner unit, for example. The swage connector device 10 includes a fitting (i.e., fitting body) 20 having an interior surface 25 and an exterior surface 27, wherein the interior surface 25 defines an interior cavity 100 extending along a fitting axis A. The fitting body 20 can be formed with a tube stop 11 extending radially inwardly from the interior surface 25 and separating the interior surface 25 into a first segment 35 and a second segment 37, wherein the first segment 35 of the interior surface comprises an axially inner portion 12, an axially outer portion 15, a first axially intermediate portion 13 and a second axially intermediate portion 14. The first segment 35 can be secured around the swaged area of a pipe (e.g., 19 in FIG. 2) and the second segment 37 can house a packing arrangement that facilitates connection to an external pipe. Example packing arrangements for the second segment 37 are known and provided for by Quick Fitting Holding Company, LLC of Warwick, Rhode Island. In various embodiments, the second segment 37 is formed with a second segment axially inner portion having a second segment axially inner portion radial depth that is less than the axially inner portion radial depth of the first segment. Further, the second segment axially intermediate segment can have a second segment axially intermediate radial depth that is less than a first axially intermediate portion radial depth of the first axially intermediate portion 13 of the first segment 35.

Figure 6:
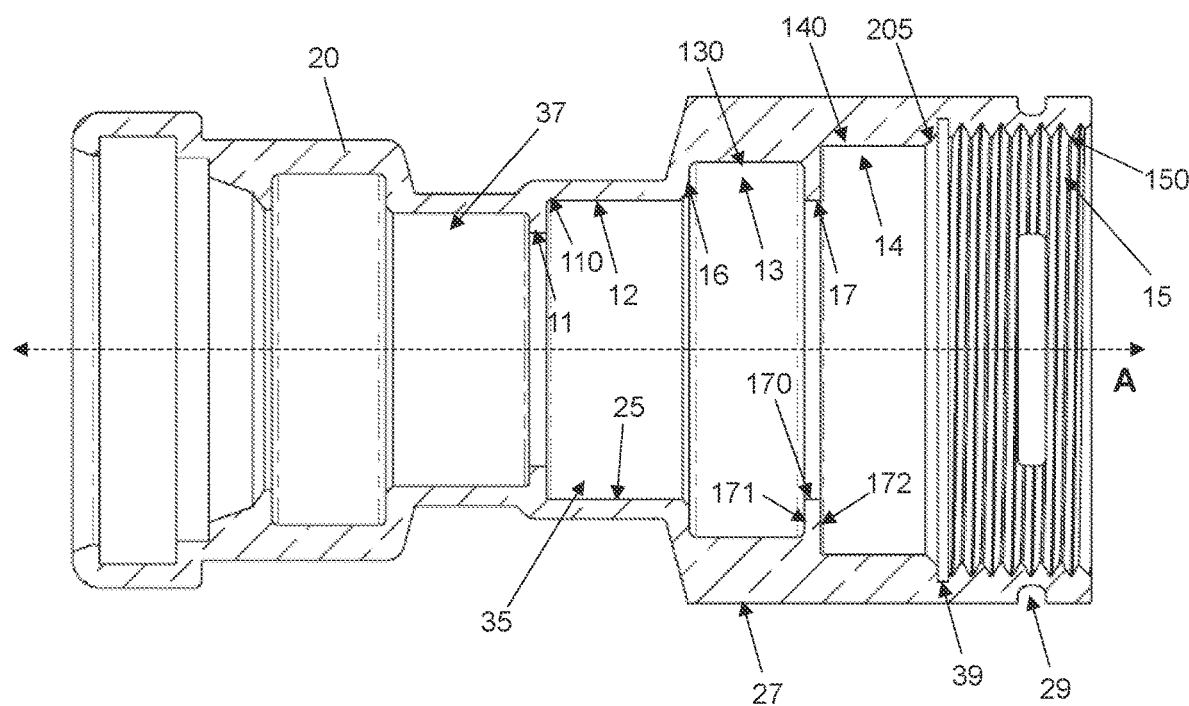
FIG. 6 is a cross-sectional view of the fitting body taken along the line 6-6 of FIG. 5.

As shown in FIG. 6, the axially inner portion 12 extends from a base 110 of the tube stop 11 axially outwardly from the tube stop to a ledge 16, wherein the ledge 16 extends radially outwardly from the axially inner portion 12 to a first portion floor 130 of the first axially intermediate portion 13, wherein the first axially intermediate portion 13 extends from the ledge 16 axially outwardly to a retaining nub 17. The retaining nub 17 extends radially inwardly from the first portion floor 130 of the first axially intermediate portion 13 to an axially extending plateau 170, such that the retaining nub 17 has an axially inner radially extending wall 171 and an axially outer radially extending wall 172. The plateau 170 can have a plateau radial depth equal to or less than the axially inner portion radial depth.

In various embodiments, radially extending wall 172 extends radially further than radially extending wall 171, thus providing second axially intermediate portion 14 with a radial depth that is larger than the radial depth of first axially intermediate portion 13. The second axially intermediate portion 14 extends axially outwardly along a second portion floor 140 from the radially extending wall 172 to the axially outer portion 15. The axially outer portion 15 can be formed with a thread 150 to facilitate connection with the cap member 28 as described elsewhere herein. Between the thread 150 and the second portion floor 140, a radially outwardly extending retention slot 39 is formed for receiving the retainer grip ring 26 and an angled wall 205 can be provided for adequate moving space for the retainer grip ring 26 during operation as described elsewhere herein. In various embodiments, the exterior surface 27 of the fitting 20 is formed with a radially inwardly extending slot 29, which can receive a locking clip 32 as described elsewhere herein.

Figure 2:
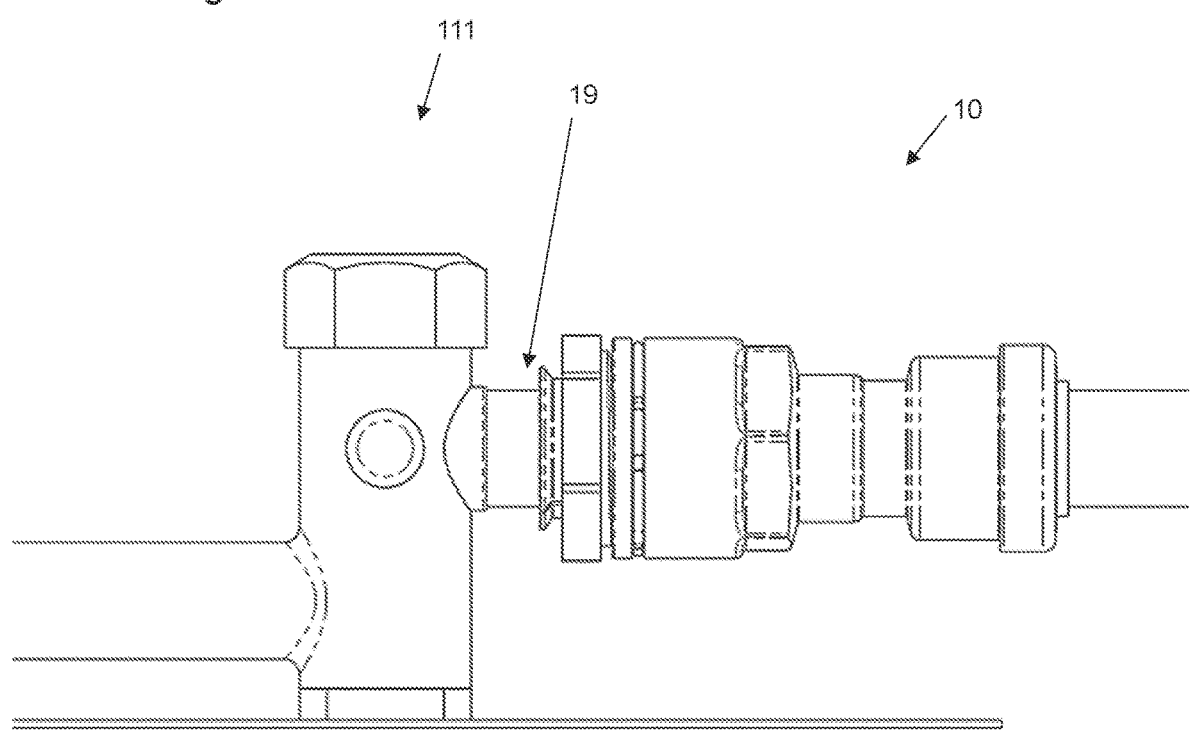
FIG. 2 is a front view of a device in accordance with embodiments of the present disclosure in an installation environment.
Figure 3:
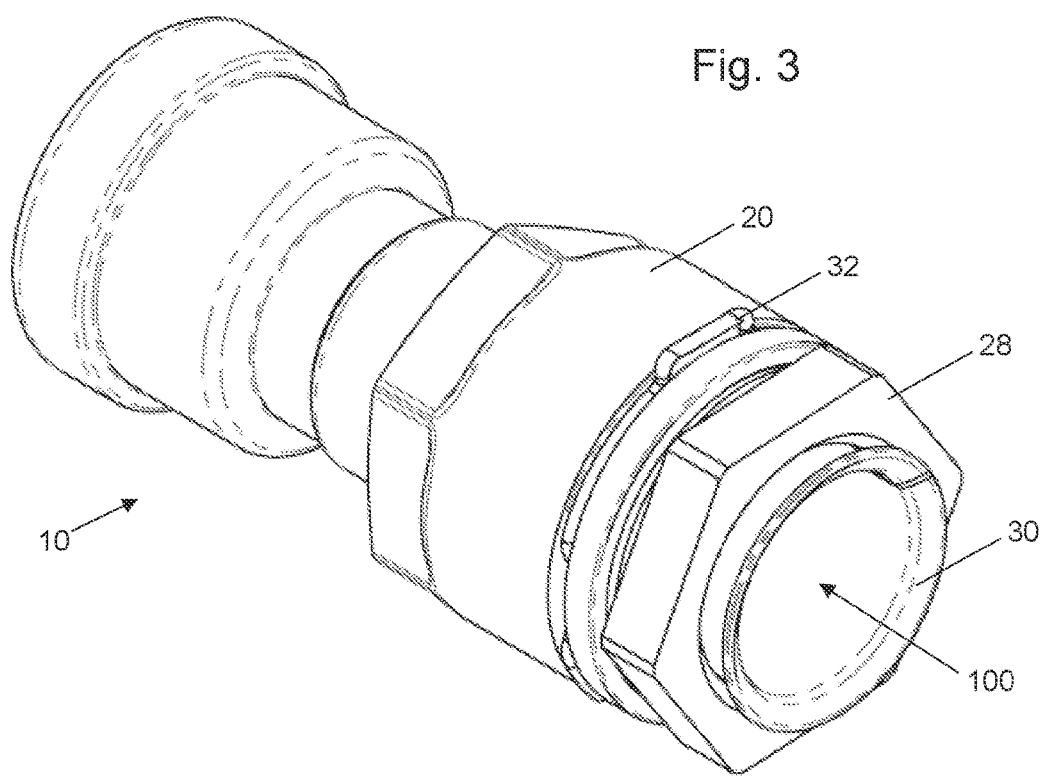
FIG. 3 is a front perspective view of a swage connector assembly in accordance with embodiments of the present disclosure.
Figure 4:
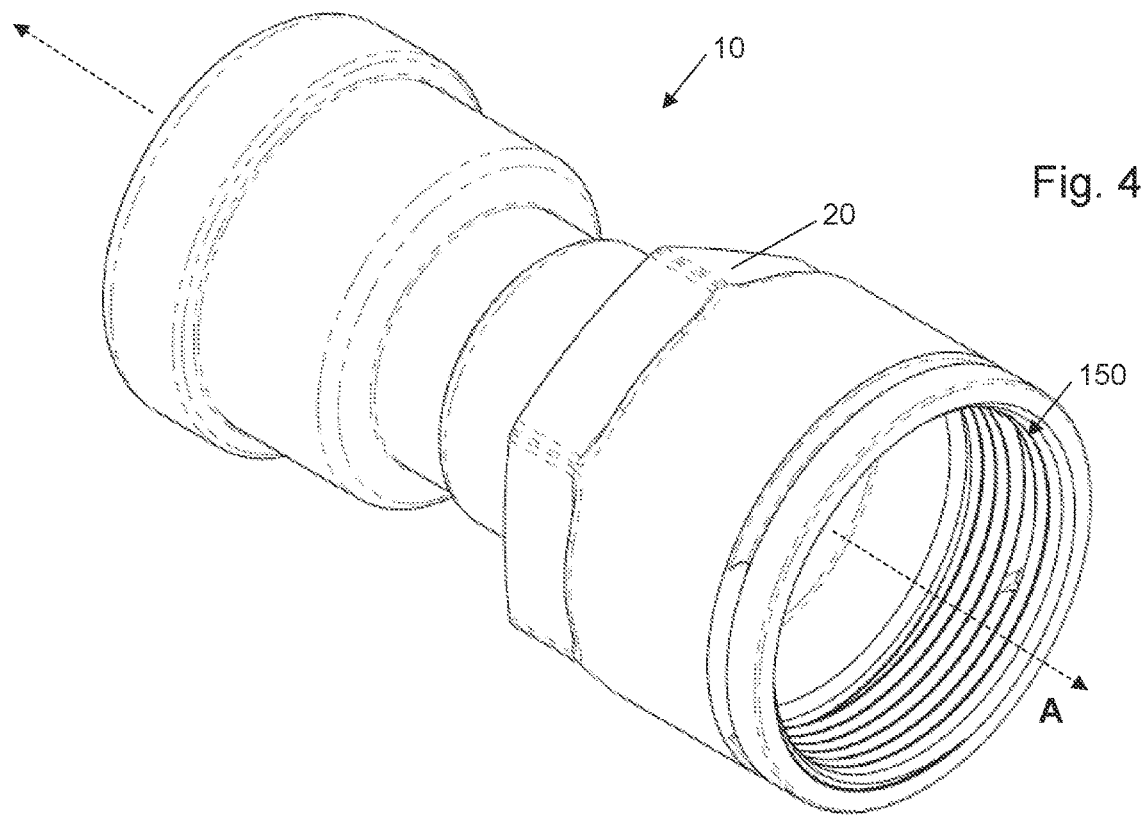
FIG. 4 is a front perspective view of a fitting body in accordance with embodiments of the present disclosure.
Figure 5:
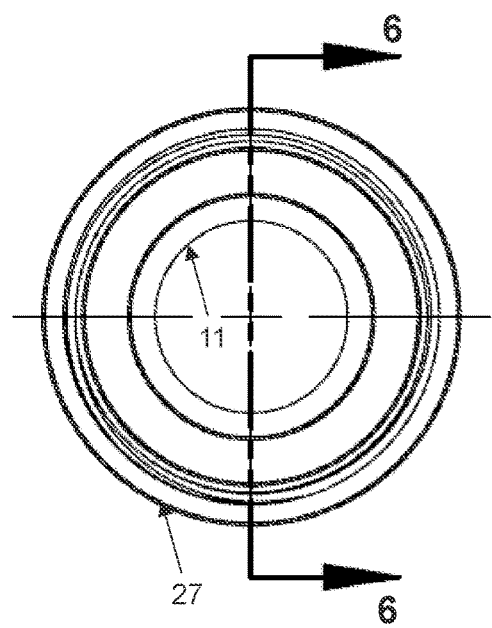
FIG. 5 is a right side view of the fitting body of FIG. 4.

As shown in FIG. 1, the swage connector device 10 includes one or more sealing rings 22, a fastening ring spreader 24, a retainer grip ring 26, a cap member 28 and a fastener push ring 30. The swage connector device 10 can further including a locking clip 32 in various embodiments. The sealing ring(s) 22 can be formed of rubber and can be positioned within the first axially intermediate portion 13 of the fitting interior 25. Elements 22, 24, 26, 28 and 30 can be considered the packing assembly 380 in accordance with the present disclosure.

Figure 7:
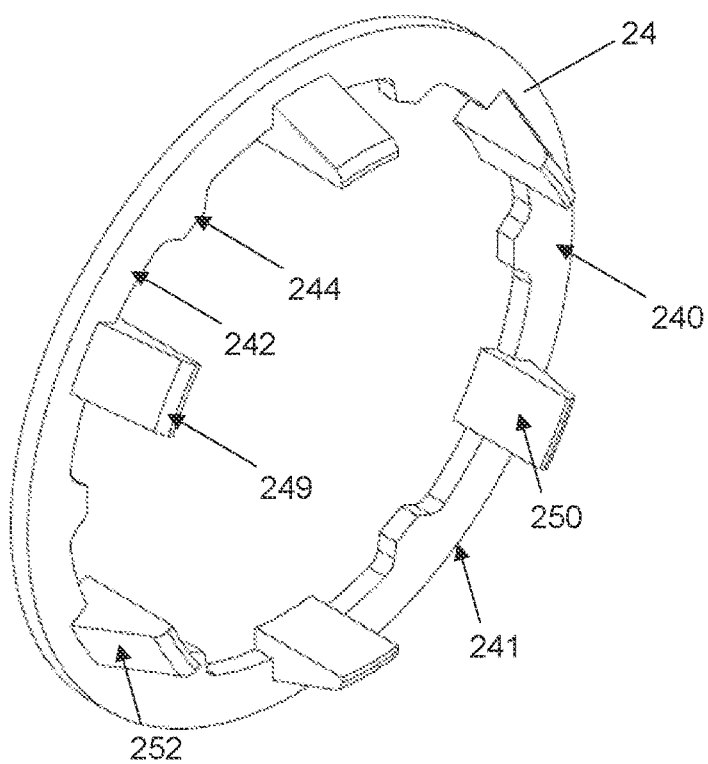
FIG. 7 is a front perspective view of a fastening ring spreader in accordance with embodiments of the present disclosure.
Figure 8:
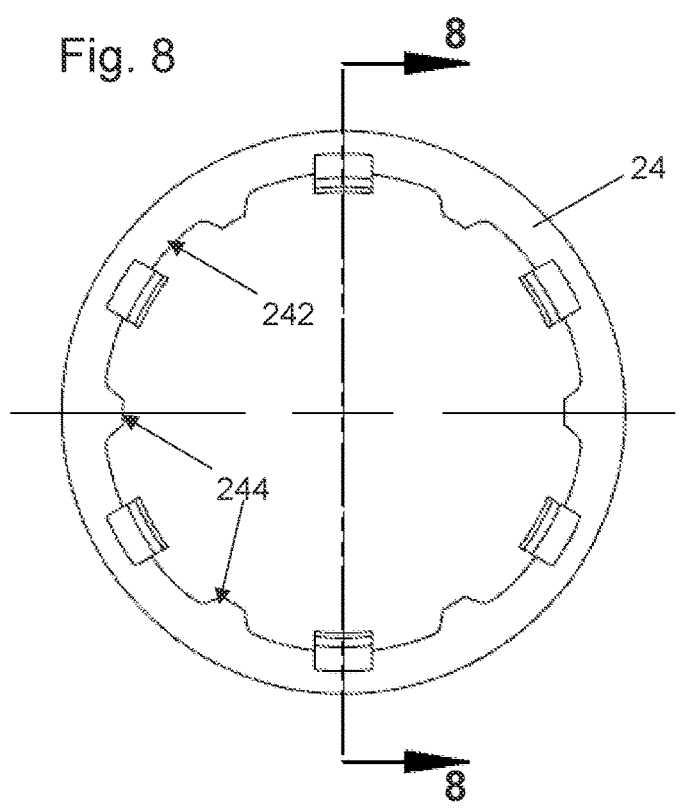
FIG. 8 is a right side view of the fastening ring spreader of FIG. 7.
Figure 9:
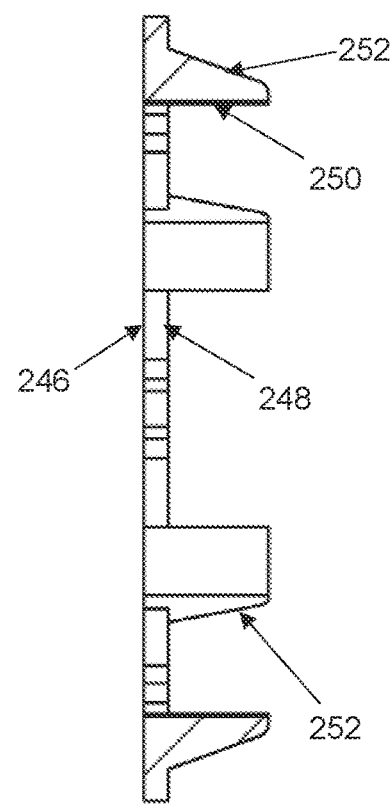
FIG. 9 is a cross-sectional view of the fastening ring spreader taken along the line 9-9 of FIG. 8.

As shown in FIGS. 7 through 9, the fastening ring spreader 24 can be formed as a ring-shaped body 240 having a circular-shaped outer surface 241 and an interior surface 242 with one or more notches 244 extending radially inwardly from the interior surface 242. The fastening ring spreader 24 includes an axially inner face 246 and an axially outer face 248 and can further be formed with one or more latches 249 extending axially outwardly from the axially outer face 248. In various embodiments, the latches 249 are formed with a radially inner face 250 and a radially outer face 252, wherein the radially inner face 250 extends only axially outwardly from the axially outer face 248 whereas the radially outer face 252 extends axially outwardly and radially inwardly from the axially outer face 248. In various embodiments, the radially inner face 250 is formed so as to extend axially across the interior surface 242 of the fastening ring spreader 24, as shown in FIG. 9. The axial extension of the radially inner face 250 facilitates smooth and even engagement with a swaged pipe whereas the axial and radial extension of the radial outer face 252 facilitates smooth engagement with the fastener push ring 30, as described elsewhere herein.

Figure 10:
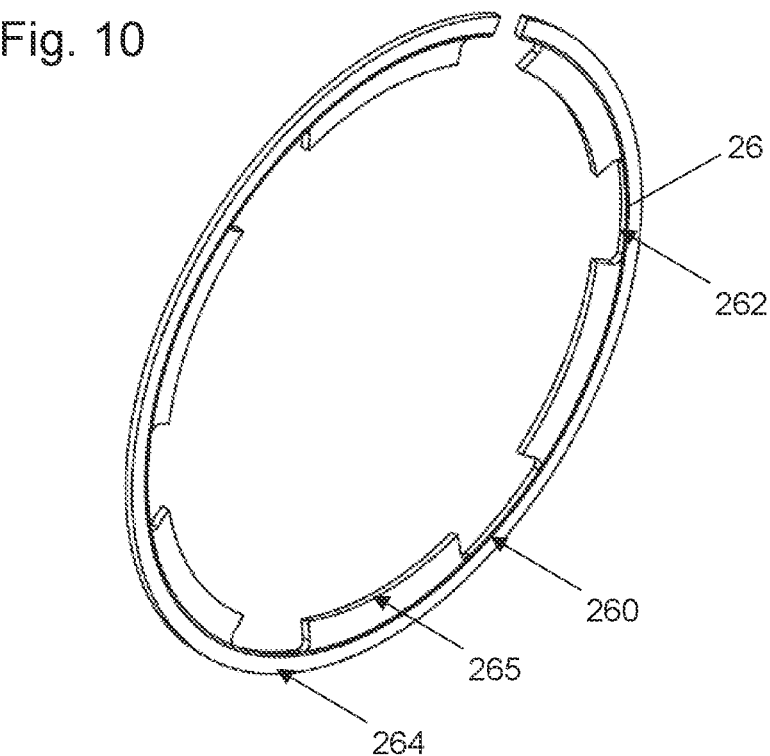
FIG. 10 is a front perspective view of a retainer grip ring in accordance with embodiments of the present disclosure.
Figure 11:
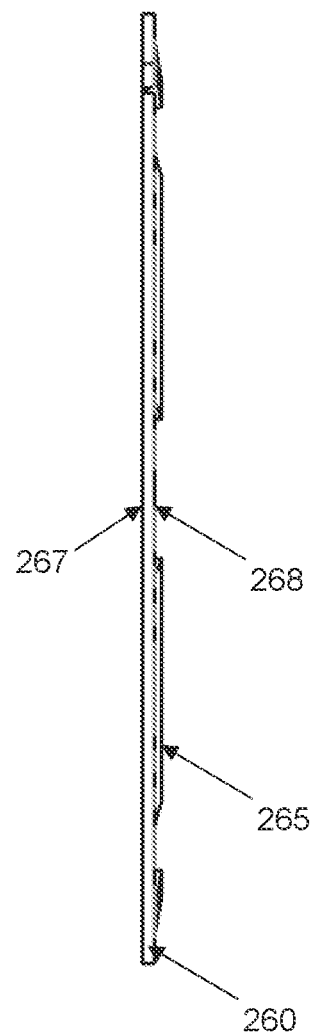
FIG. 11 is a front view of the retainer grip ring of FIG. 10.
Figure 12:
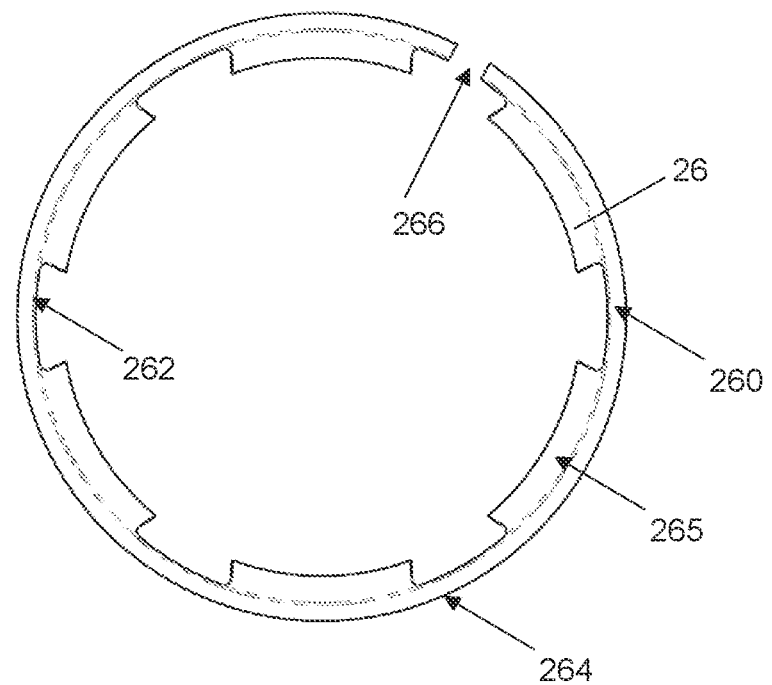
FIG. 12 is a right side view of the retainer grip ring of FIG. 10.

As shown in FIGS. 10 through 12, the retainer grip ring 26 is formed with a substantially ring-shaped retainer base 260 having radially inner 262 and radially outer 264 surfaces, with one or more teeth 265 extending radially inwardly from the radially inner surface 262. The retainer grip ring 26 can be formed with a split 266, in various embodiments, to facilitate insertion and removal from the fitting 20. The retainer grip ring base 260 further includes a first face 267 and a second face 268, wherein the teeth 265 extend slightly axially outwardly on the second face 268 side of the retainer base 260.

As shown in FIGS. 13 through 16, the cap member 28 is formed with a head 280 and body 281, wherein the body 281 includes a body interior surface 282 and a body exterior surface 283, wherein the body exterior surface 283 can include a thread 284 and/or 288, an axially extending clip receiving surface 285 and an axially extending grip ring receiving surface 286. The grip ring receiving surface 286 is bounded by radially outwardly extending interior 287 and exterior 289 walls, which limit the axial sliding engagement of the retainer grip ring 26 during operation. In various embodiments, the thread includes a first thread 284 formed axially between the head 280 and the axially extending clip receiving surface 285, and a second thread 288 formed axially between the axially extending clip receiving surface 285 and the axially extending grip ring receiving surface 286. A radial lip 279 can be provided at the axially outer edge 290 of the cap member 28. In various embodiments, the head 280 has a tapered internal surface 291 and a substantially cylindrical internal surface 292 that is aligned and has the same radial depth as the body interior surface 282. As shown in FIG. 16, the cap member body interior surface 282 forms an opening 275 extending axially through the cap member 28 along a cap axis 277. In various embodiments, the body interior surface 282 has a staggered radial depth, so as to include a narrower first interior surface portion 293 and a wider second interior surface portion 295. The narrower first interior surface portion 293 can be considered the primary axial segment and the wider second interior surface portion 295 can be considered a secondary axial segment of the body interior surface 282. In various embodiments, the primary axial segment 293 extends radially outwardly from the cap axis 277 less than the secondary axial segment 295 extends radially outwardly from the cap axis 277. As described elsewhere herein, the primary axial segment 293 engages the body radially outer surface 303 of the fastener push ring 30 whereas the secondary axial segment 295 has a greater radial depth to accommodate the latch extensions 330 and teeth 308 of the fastener push ring 30.

A radially extending wall 294 is formed between the first interior surface portion 293 and the second interior surface portion 295 and an axially outer end wall 298 extends radially outwardly from the second interior surface portion 295. The radial extending wall 294 can engage the latch extension(s) 30 for support during operation. An angled wall surface 299 at the radially exterior portion of the axially outer end wall 298 provides a retainer grip ring 26 engaging surface when the cap member 28 is being installed with the fitting 20 as described elsewhere herein.

As shown in FIGS. 17 through 20, the fastener push ring 30 can be provided with a substantially ring-shaped body 301 with a radially inner surface 302 and a radially outer surface 303. The body 301 can be splayed axially and radially outwardly at a first axial end 305 and can be provided with spreader engaging teeth 308 at a second axial end 306. In various embodiments, the teeth 308 are formed as pairs 315 separated by a tooth gap 310, wherein each pair 315 of teeth 308 is separated by a pair gap 312. In various embodiments, each pair 315 can include a pair base 320 extending axially and radially outwardly from the radially outer surface 303 at the second axial end 306 to an apex 322, wherein the teeth 308 extend axially outwardly and radially inwardly from the apex 322, with a tooth gap 310 separating each of the teeth 308 in the pair as the teeth 308 extend axially outwardly and radially inwardly from the apex 322. The pairs 315 of teeth 308 as separated by the pair gaps 312 provides a forked leading edge 325, and in various embodiments, the teeth 308 extend radially inwardly of the radially inner surface 302 of the body 301. The forked leading edge 325 provides connector elements that interact with mating elements of the fastening ring spreader 24 during operation as disclosed elsewhere herein.

In further embodiments, the radially outer surface 303 of the body 301 is formed with latch extensions 330 extending from the body 301. The latch extensions 330 can include a first segment 333 extending axially and radially outwardly of the radially outer surface 303 to a pinnacle 332, and a second segment 334 extending axially outwardly and radially inwardly of the pinnacle 332. The radially outer surface 303 is formed with a gap 335 between the second segment 334 of the latch extension 330 and an axially distant edge 336 of the radially outer surface 303 of the body 301. The latch extensions 330 interact with the cap 28 and underlying pipe during operation as disclosed elsewhere herein. In various embodiments, the fastener push ring 30 is formed with a split 340 to facilitate insertion into the cap 28 during operation.

Figure 21:
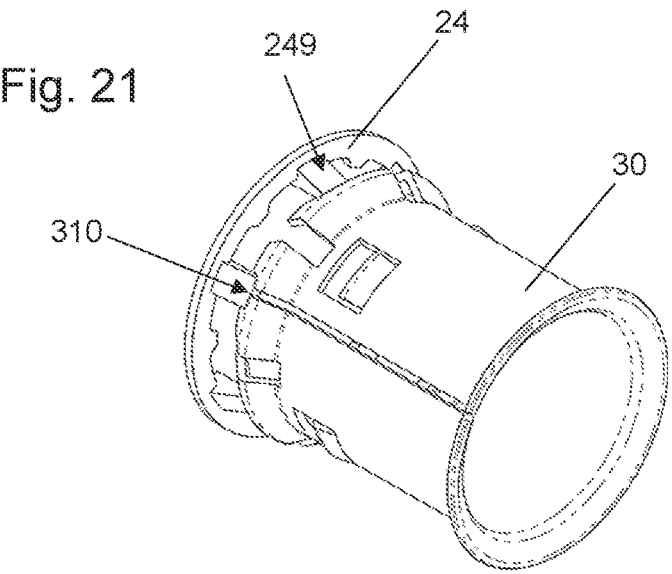
FIGS. 21-23 are different perspective views of a fastening ring spreader enjoined with a fastener push ring in accordance with embodiments of the present disclosure.
Figure 22:
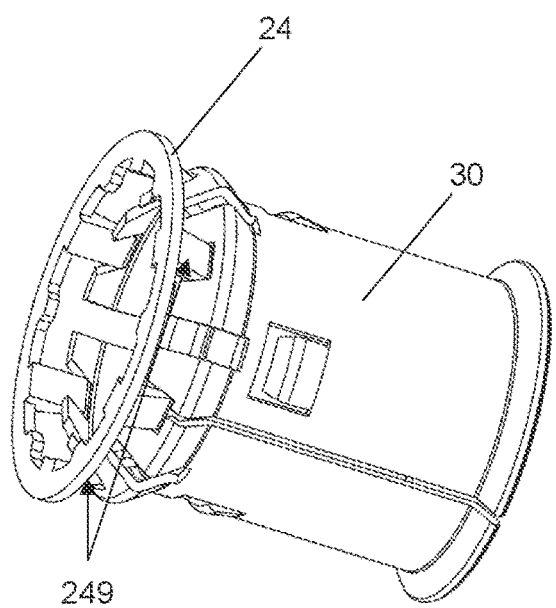
Figure 23:
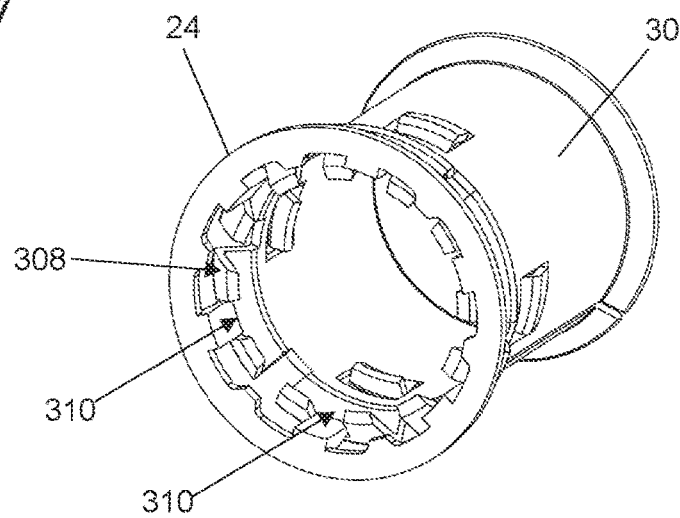
Figure 24:
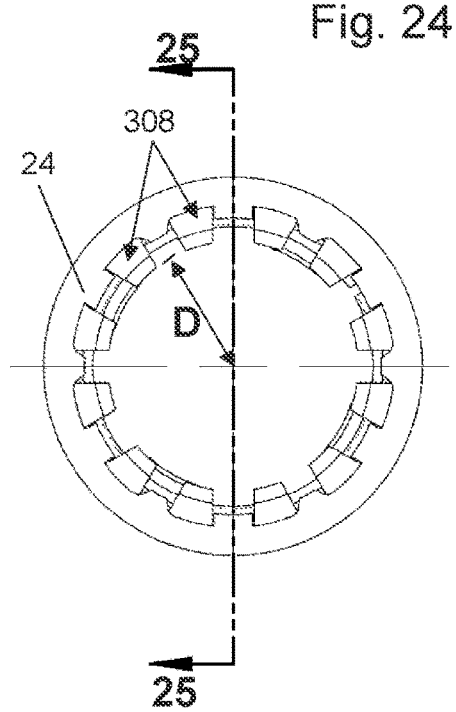
FIG. 24 is a left side view of a fastening ring spreader enjoined with a fastener push ring in a first position in accordance with embodiments of the present disclosure.
Figure 25:
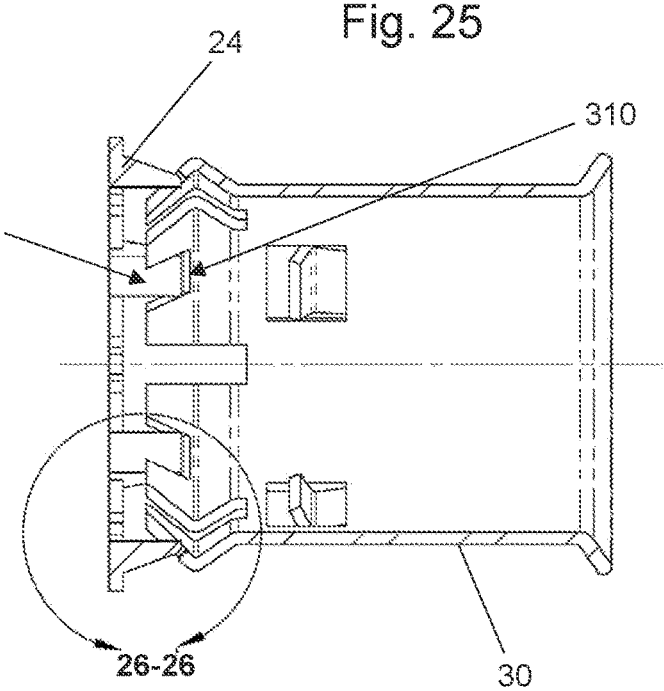
FIG. 25 is a cross-sectional view taken along the line 25-25 of FIG. 24.
Figure 26:
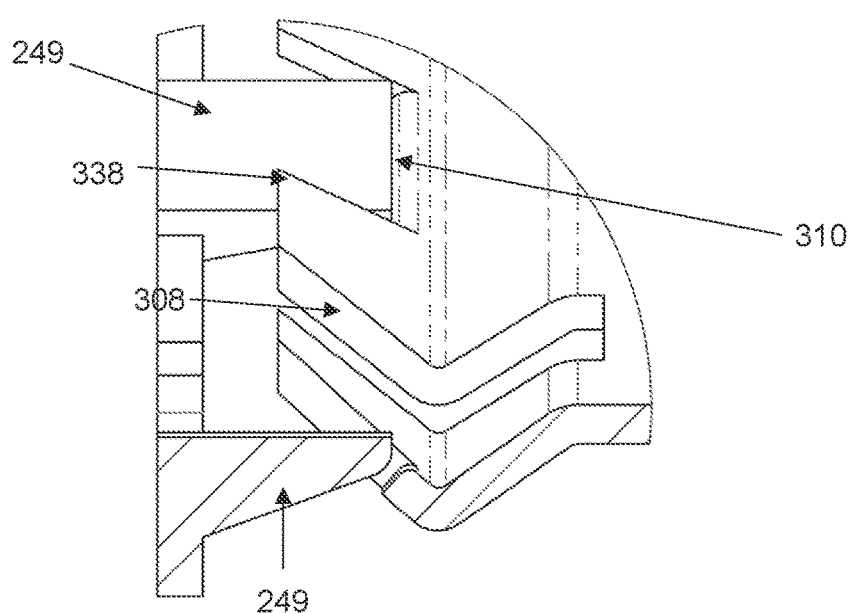
FIG. 26 is an enlarged view of encircled portion 26-26 of FIG. 25.
Figure 27:
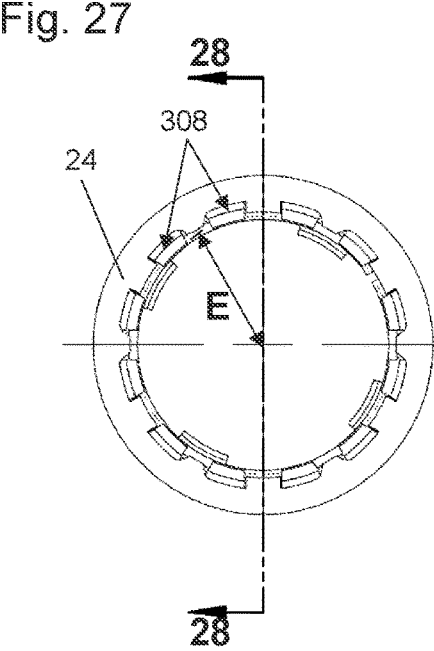
FIG. 27 is a left side view of a fastening ring spreader enjoined with a fastener push ring in a further position in accordance with embodiments of the present disclosure.
Figure 28:
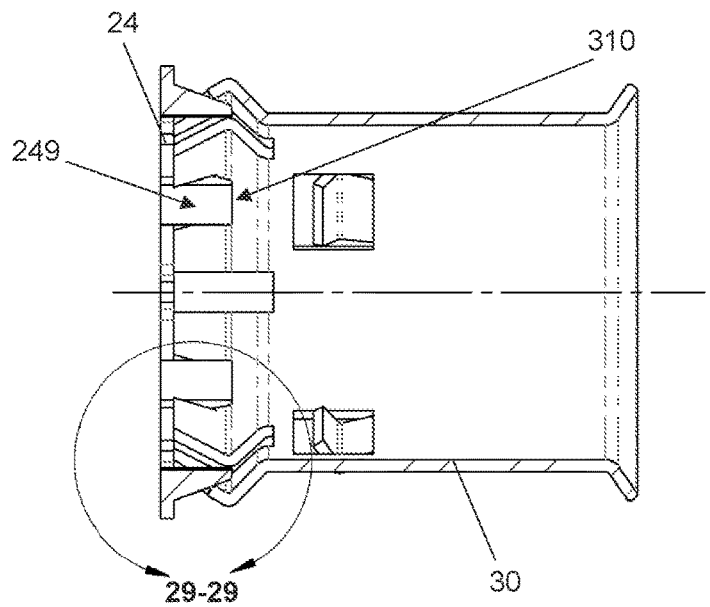
FIG. 28 is a cross-sectional view taken along the line 28-28 of FIG. 27.
Figure 29:
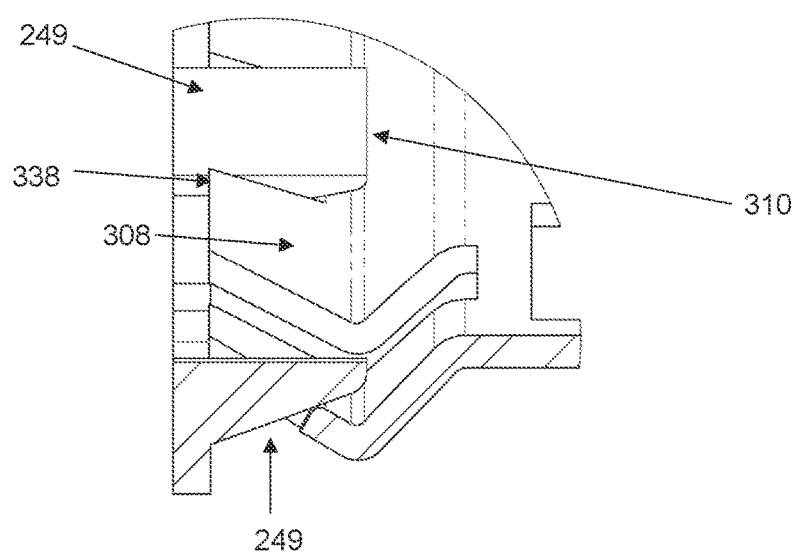
FIG. 29 is an enlarged view of encircled portion 29-29 of FIG. 28.

FIGS. 21 through 29 show interaction between the fastening ring spreader 24 and the fastener push ring 30. As shown in FIGS. 21 through 23, the latches 249 of the fastening ring spreader 24 are aligned with respective tooth gaps 310 of the forked leading edge 325 of the fastener push ring 30. The further the latches 249 extend into the tooth gaps 310, the more pressure is applied to the tooth outer edges 338, thereby opening the teeth 308 wider to accommodate axial movement of the device 10 around a swaged pipe during operation. For example, as shown in FIG. 24, teeth 308 extend radially inwardly to a radial depth D as the fastening ring spreader 24 is being inserted and are expanded to a larger radial depth E as shown in FIG. 27 once the latches 249 of the fastening ring spreader 24 act to open up the teeth 308. The pair gaps 312 provide room for the teeth pairs 315 to flex back and forth during operation.

Figure 30:
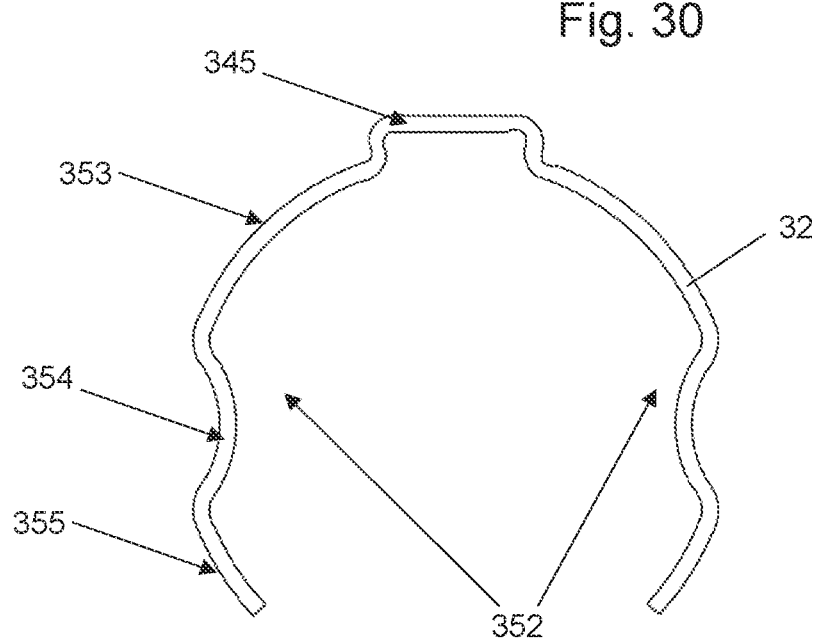
FIG. 30 is a front view of a locking clip in accordance with embodiments of the present disclosure.
Figure 31:
FIG. 31 is a right side view of the locking clip of FIG. 30.
Figure 32:
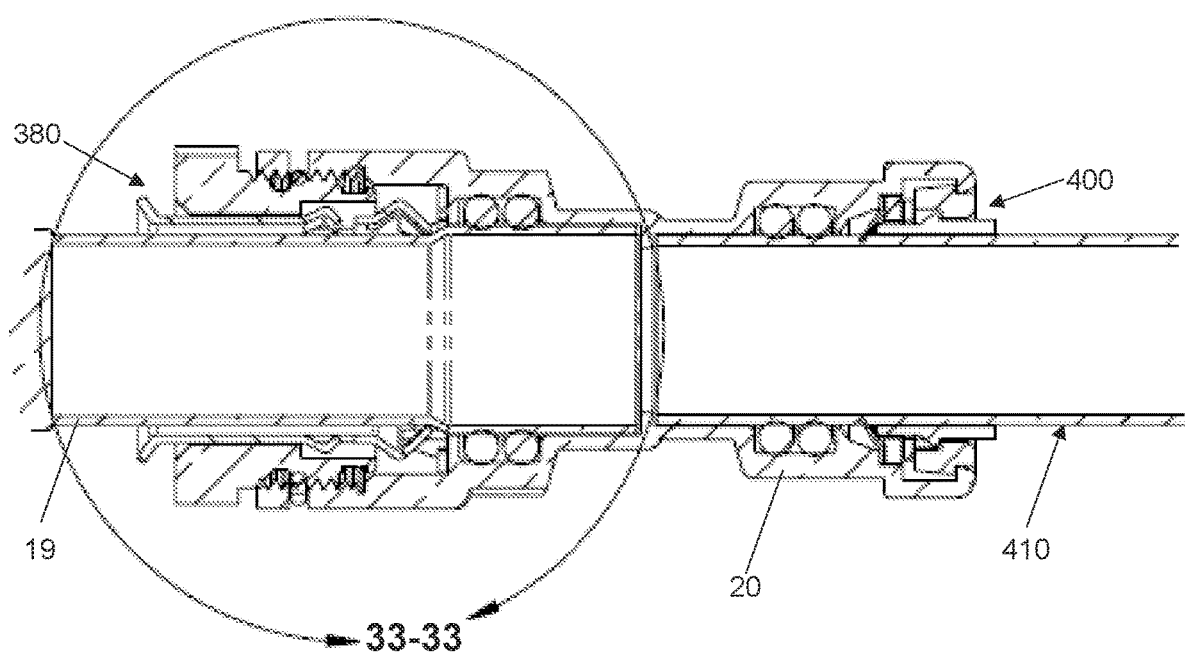
FIG. 32 is a cross-sectional view of a swage connector assembly in a first position in accordance with embodiments of the present disclosure.

As shown in FIGS. 30 and 31, the locking clip 32 is provided with a spine 345 and two legs 352. Each leg 352 can be formed with a convex upper segment 353, a concave middle segment 354 and a convex lower segment 355 to facilitate interoperation with the slot 29 on the exterior surface 27 of the fitting 20.

FIGS. 32 through 42 depict interaction of the various components of the swage connector device and assembly during operation. As shown therein, the swaged pipe 19 is mated with the swage connector device 10 including the packing assembly 380 at one end corresponding to the first segment 35 of the interior surface 25 of the fitting 20. The swaged pipe 19 is shown to expand from an interior surface 73 having a first radial depth along a swaged portion 75 to an interior surface 77 having a second radial depth larger than the first. A separate packing arrangement 400 can be inserted into the second segment 37 of the interior surface 25 of the fitting 20.

The sealing ring(s) 22 are inserted into the first axially intermediate portion 13 of the interior surface 25 of the swage connector device 10. The fastening ring spreader 24 is inserted into the cavity 100 such that the axially inner face 246 of the fastening ring spreader 24 abuts the axially outer radially extending wall 172 of the retaining nub 17 of the fitting 20. The retainer grip ring 26 is inserted into the cavity 100 so as to be retained by the retention slot 39 of the fitting 20.

Figure 33:
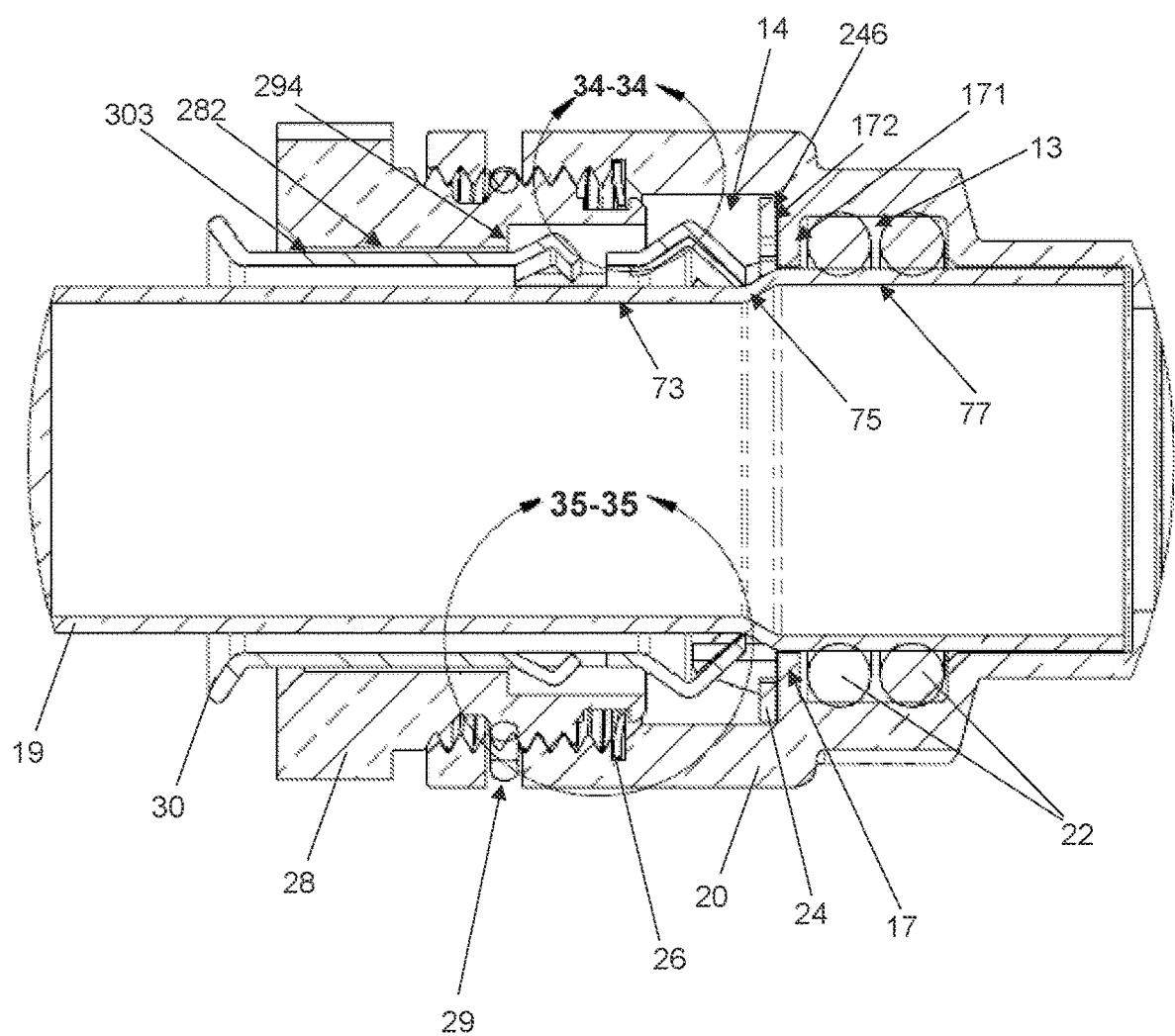
FIG. 33 is an enlarged view of encircled portion 33-33 of FIG. 32.
Figure 34:
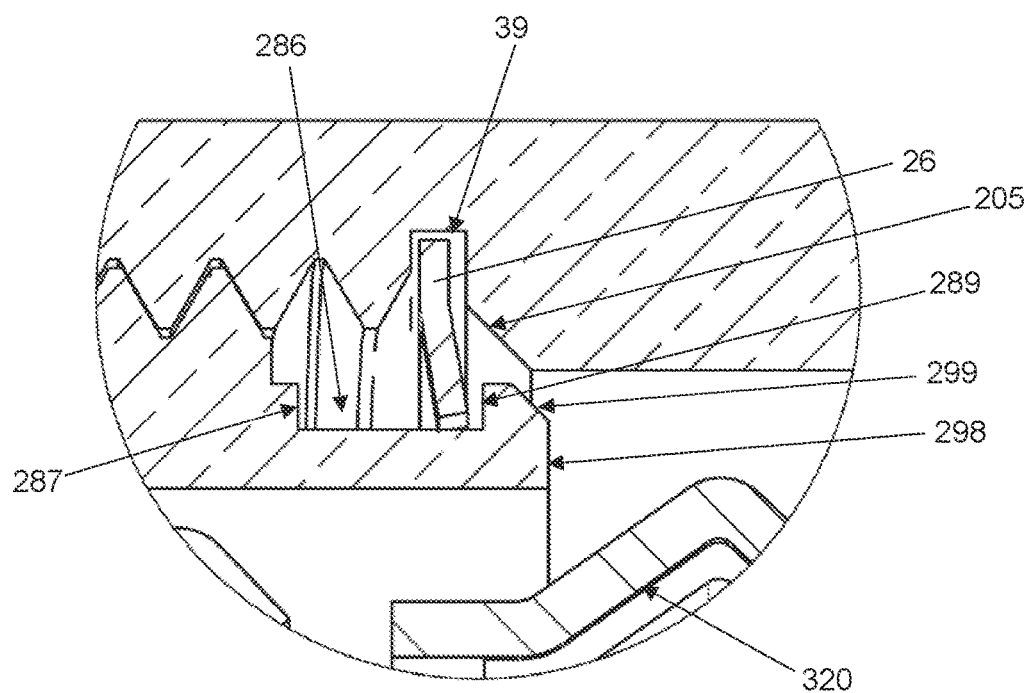
FIG. 34 is an enlarged view of encircled portion 34-34 of FIG. 33.
Figure 35:
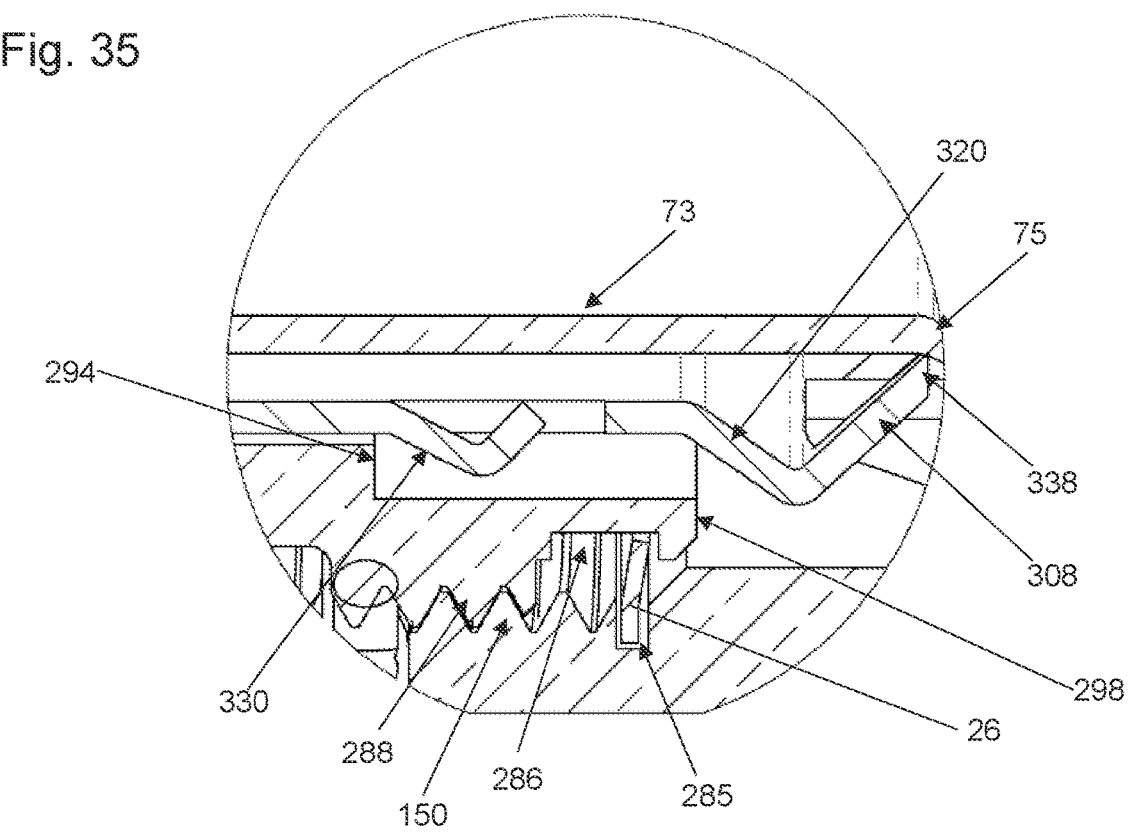
FIG. 35 is an enlarged view of encircled portion 35-35 of FIG. 33.
Figure 36:
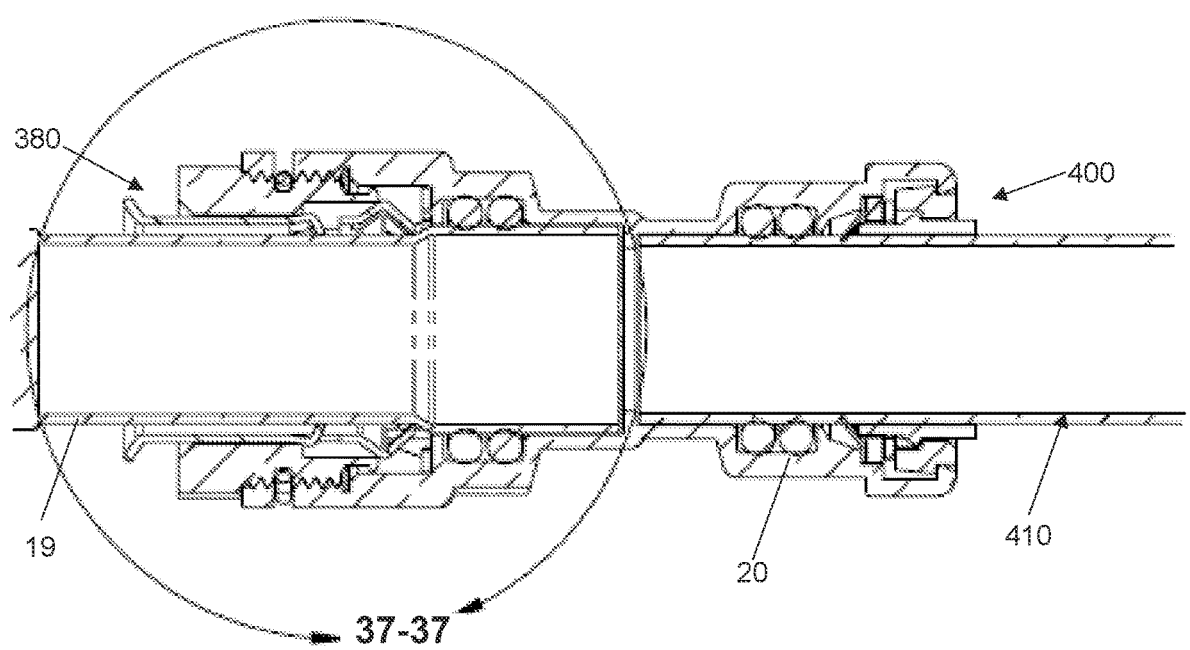
FIG. 36 is a cross-sectional view of a swage connector assembly in a further position in accordance with embodiments of the present disclosure.
Figure 37:
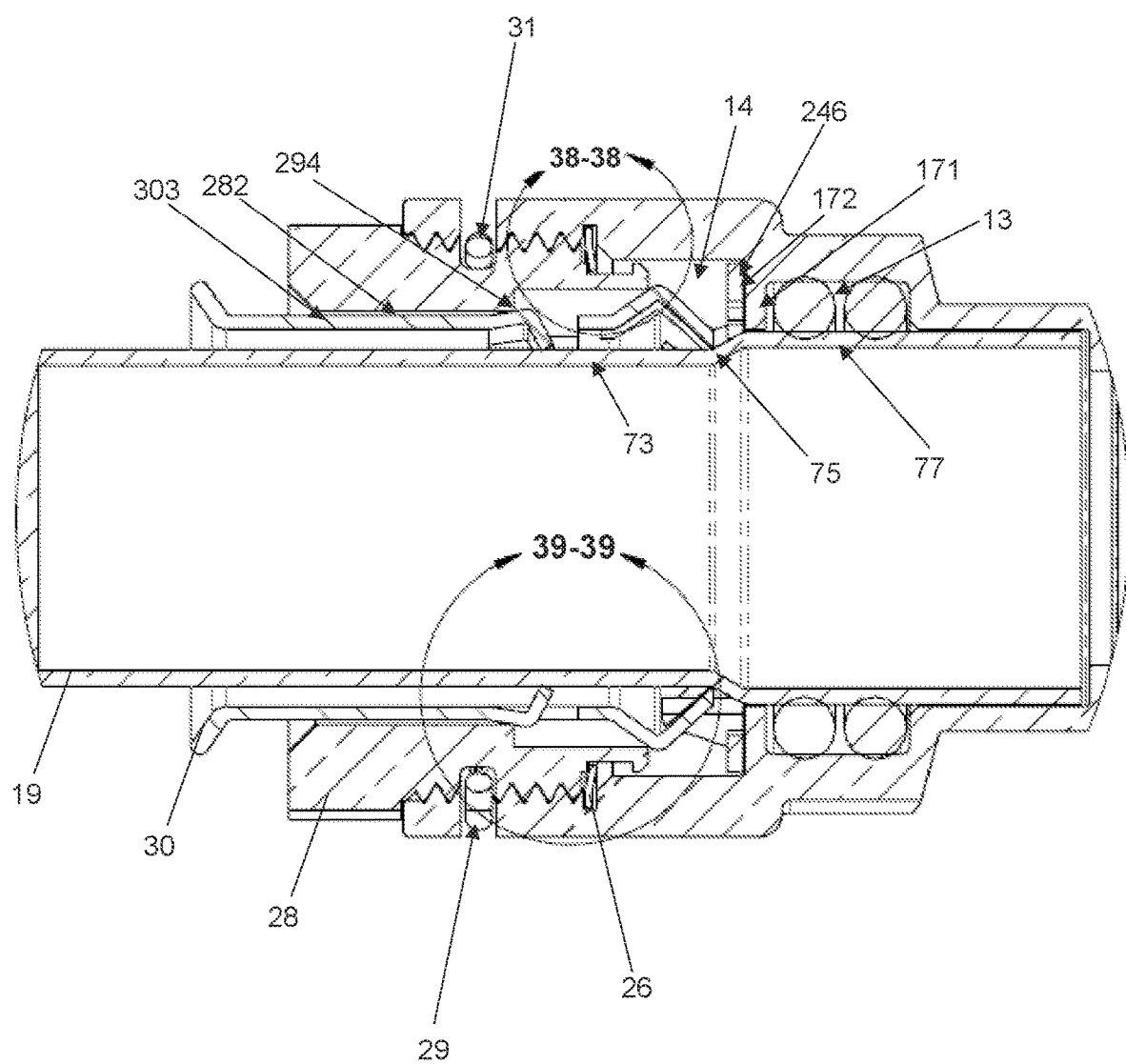
FIG. 37 is an enlarged view of encircled portion 37-37 of FIG. 36.

The fastener push ring 30 is inserted in the cap member 28 such that the radially outer surface 303 of the fastener push ring 30 engages the body interior surface 282 of the cap member 28. The fastener push ring 30 and cap member 28 may slidingly engage to a degree between the first axial end 305 of the fastener push ring and the spreader engaging teeth 308 at the second axial end 306. The second thread 288 of the cap member 28 engages the thread 150 of the fitting 20. As the cap member 28 is tightened to the fitting 20, the retainer grip ring 26 may slightly bend against angled wall 299 of the cap member 28 toward an angled wall 205 of the fitting and then snap over the angled wall 299 into the axially extending grip ring receiving surface 286 between walls 287 and 289. The retainer grip ring 26 is then maintained within the axially extending grip ring receiving surface 286 of the cap member 28. In the initially engaged position where the retainer grip ring 26 is closer to the radially outwardly extending exterior wall 289, it will be appreciated that the axially outer end wall 298 of the cap member 28 does not yet engage pair base 320 of the fastener push ring 30 and the radially extending wall 294 of the cap member 28 does not yet engage latch extensions 330 of the fastener push ring 30. It will further be appreciated that, during installation, the cap member 28 with inserted fastener push ring 30 can be slid over a swaged pipe 19 so as to be positioned around the narrower portion of the pipe 19 corresponding to the surface 73 of smaller radial depth, as illustrated in FIGS. 33 and 37, for example. The fitting 20 with inserted elements 22, 24 and 26 can then be positioned against cap member 28 and threadedly connected.

Figure 38:
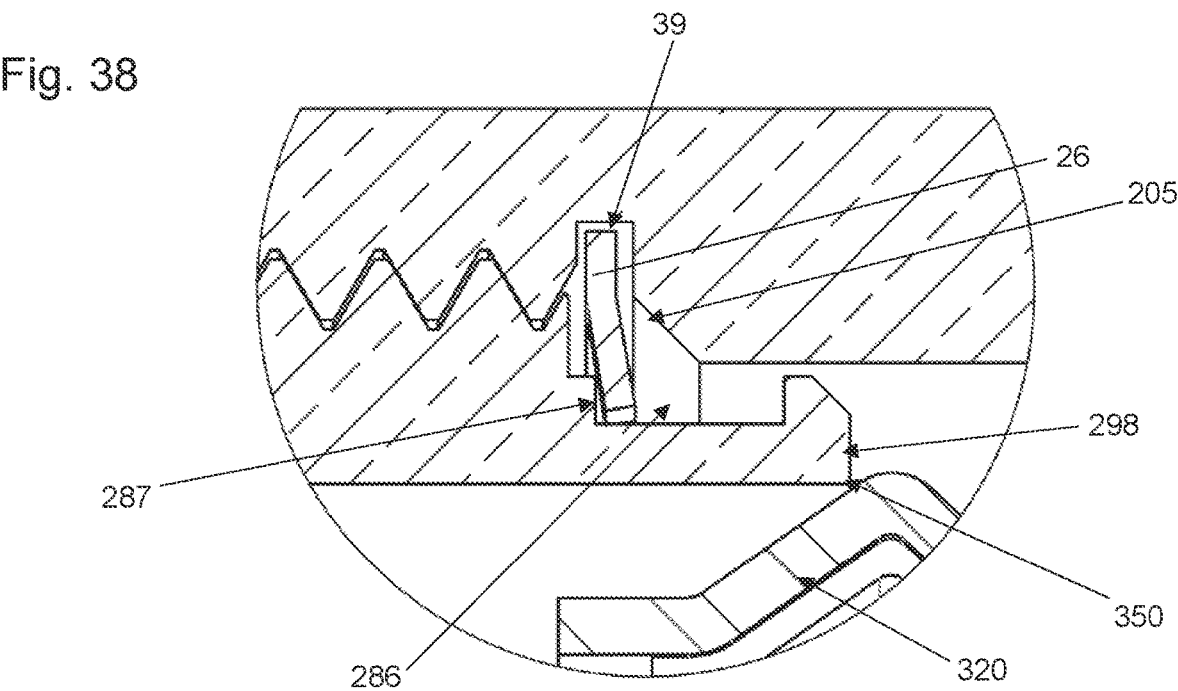
FIG. 38 is an enlarged view of encircled portion 38-38 of FIG. 37.
Figure 39:
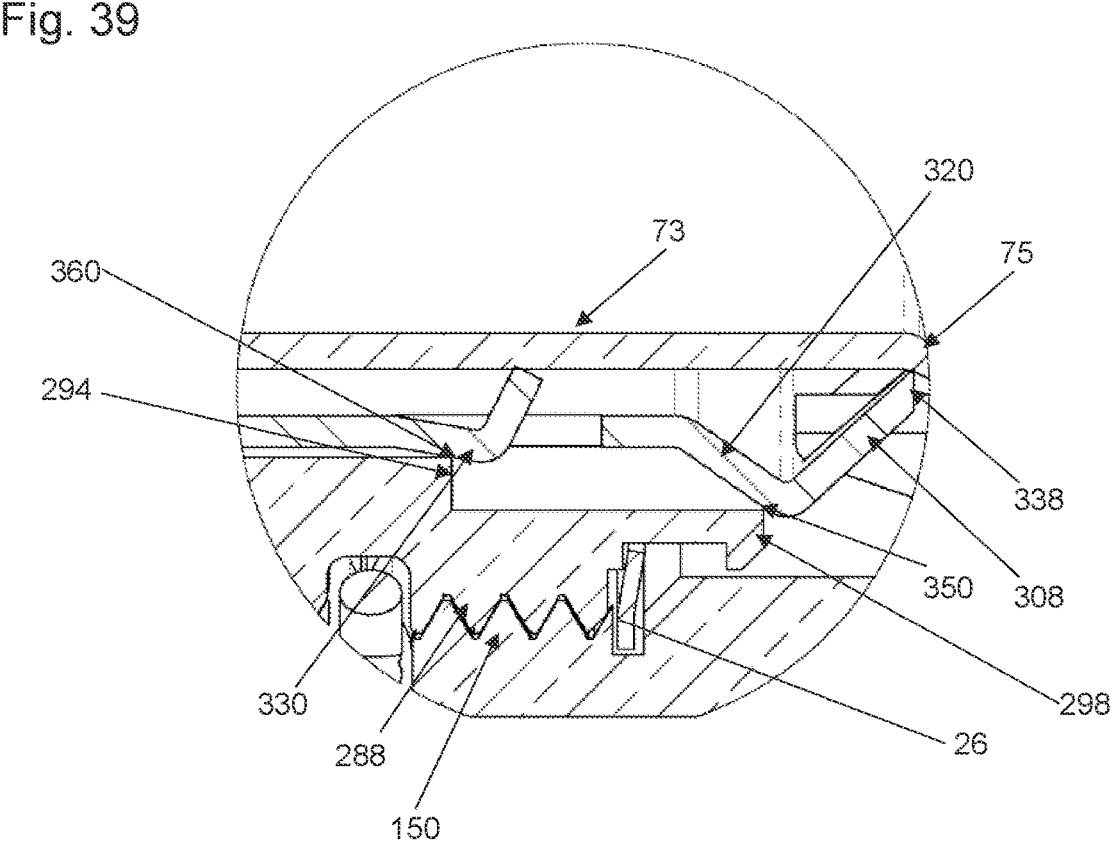
FIG. 39 is an enlarged view of encircled portion 39-39 of FIG. 37.
Figure 40:
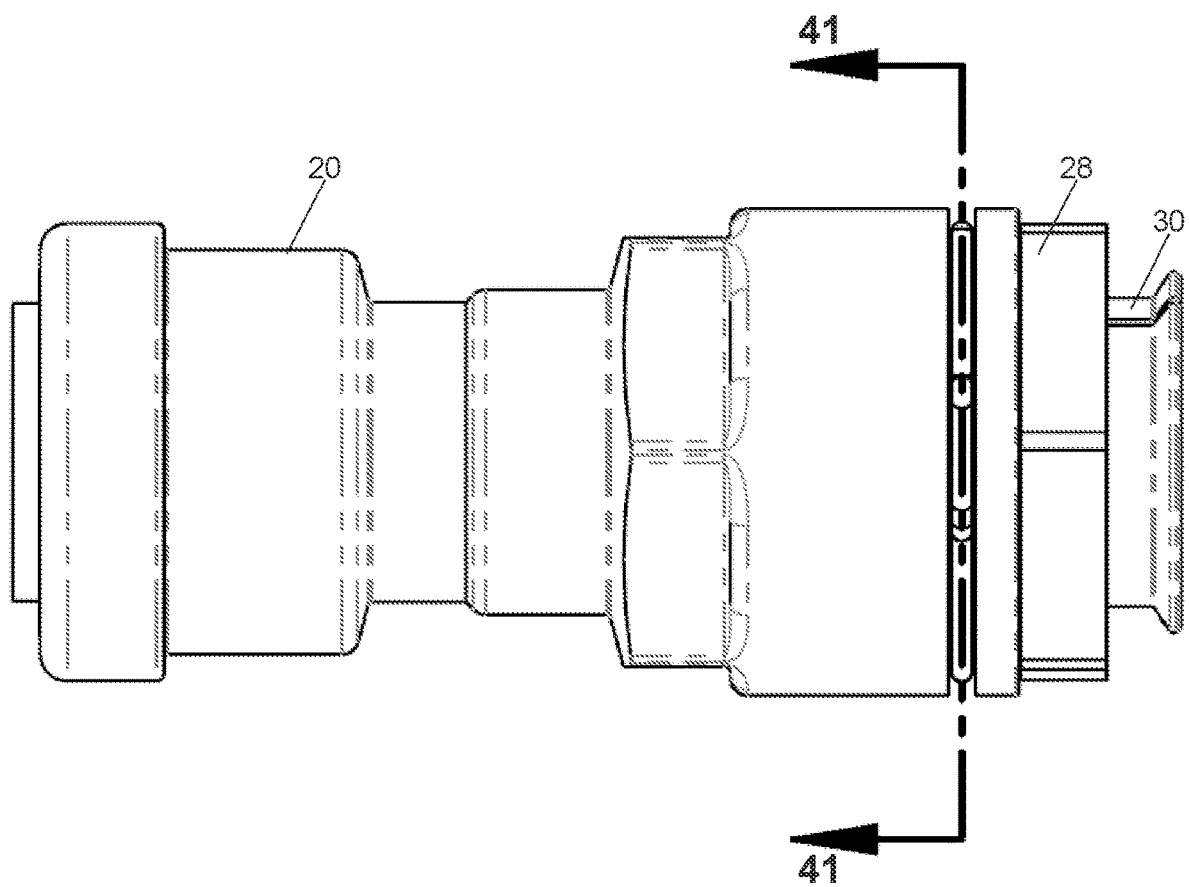
FIG. 40 is a front view of a swage connector assembly in accordance with embodiments of the present disclosure.
Figure 41:
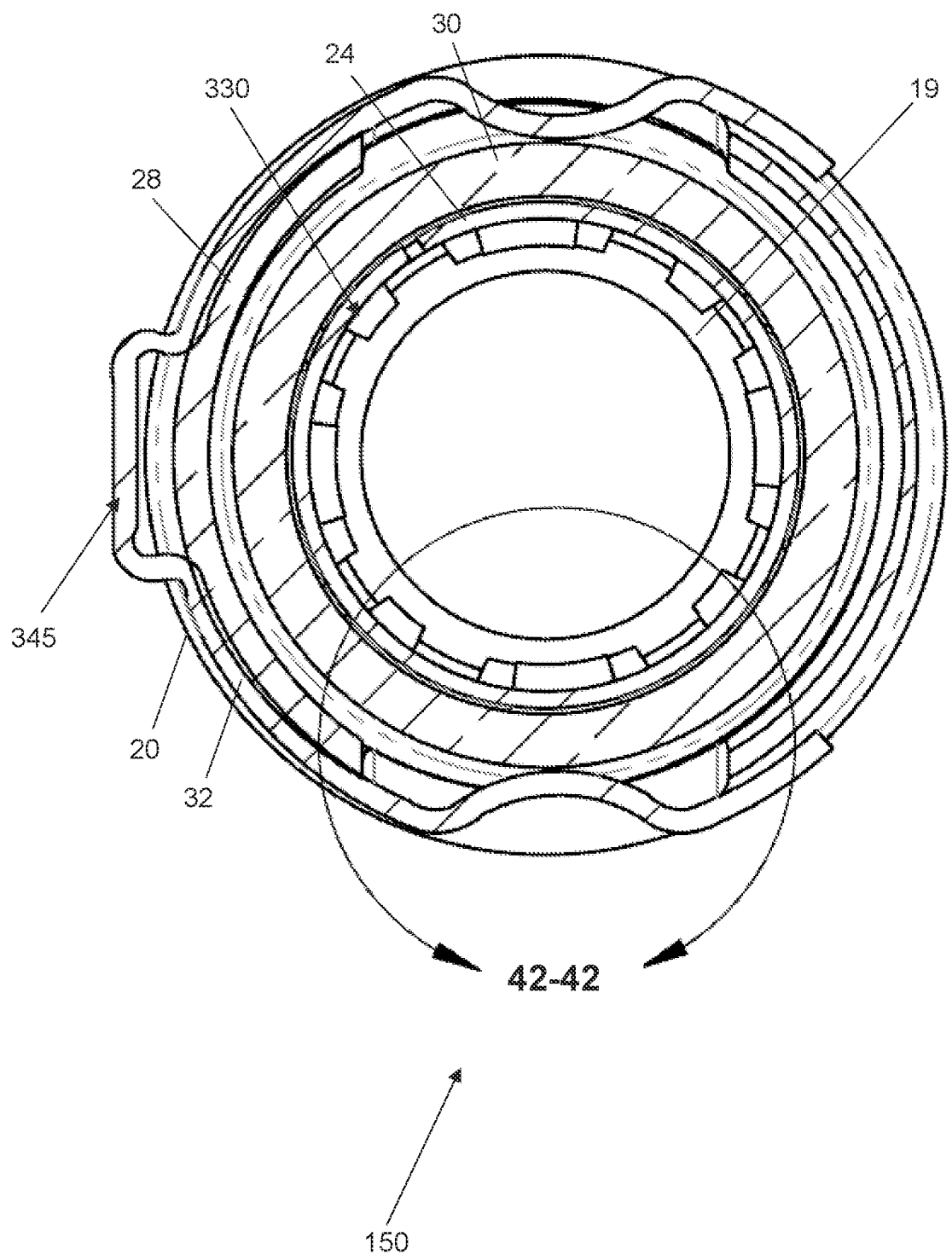
FIG. 41 is a cross-sectional view taken along the line 41-41 of FIG. 40.
Figure 42:
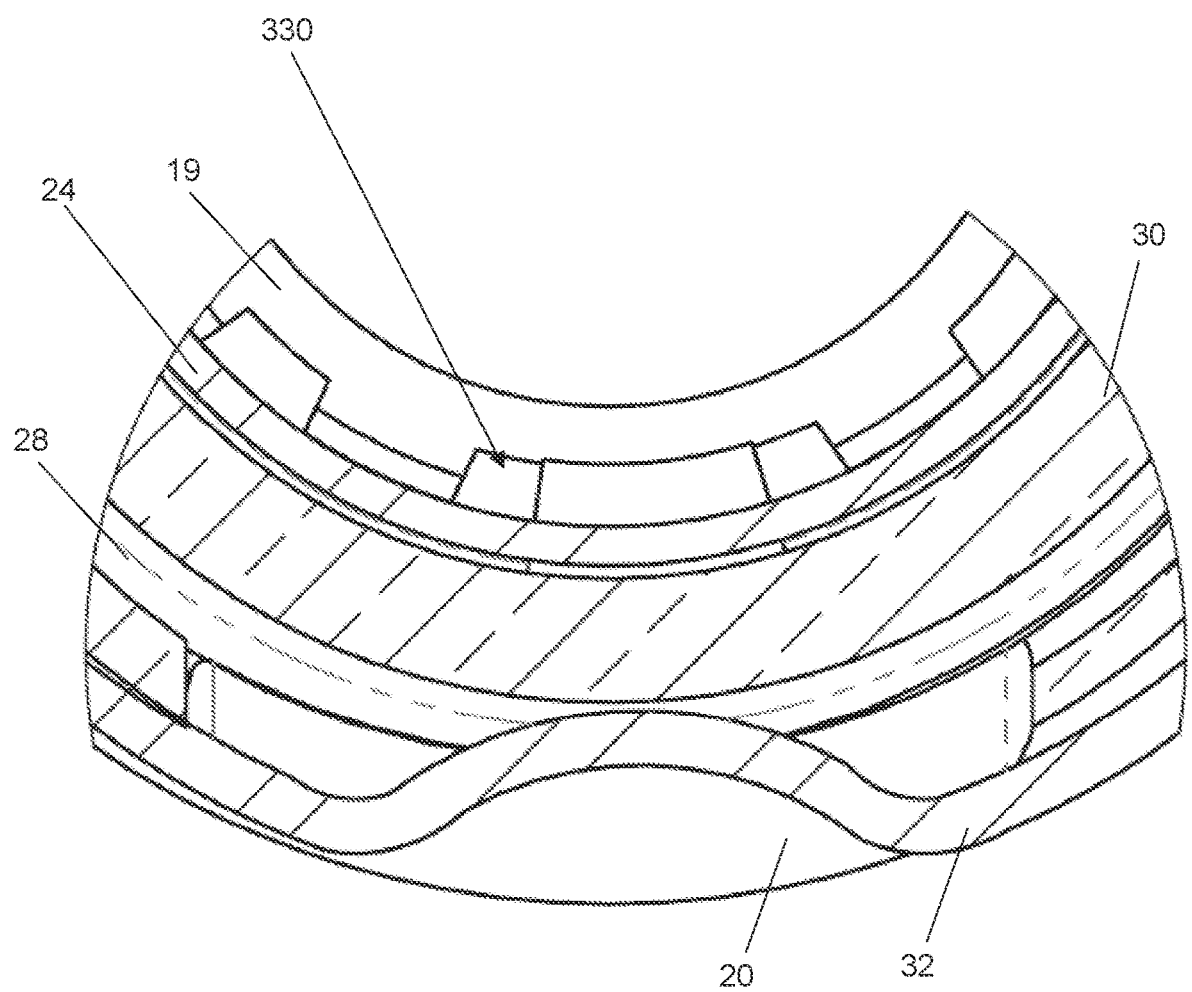
FIG. 42 is an enlarged view of encircled portion 42-42 of FIG. 41.

As shown in FIG. 38, as the cap member 28 and fitting 20 are further tightened together, the elements reach a further engaged position where the retainer grip ring 26 is closer to the radially outwardly extending interior wall 287, where the axially outer end wall 298 of the cap member 28 engages pair base 320 of the fastener push ring 30 as indicated at contact point 350 and the radially extending wall 294 of the cap member 28 engages latch extensions 330 of the fastener push ring 30 as at 360. In this position, the latch extensions 330 and the tooth outer edges 338 engage the pipe 19 to securely retain the swage connector device 10 against the swaged pipe 19. Further, the contact and support of the cap member 28 at points 350 and 360 further maintains the pressured hold of the fastener push ring 30 on the pipe 19 so that the device 10 does not slip or move in relation to the pipe 19. It will be appreciated that connection point 360 is at a first radial distance from the axis A and connection point 350 is at a second, larger radial distance from the axis A, thereby providing holding force at different radial locations adapted to the shape of the swaged pipe 19. Once in this position, the locking clip 32 can be applied by placing the legs 352 around the device 10 such that the clip 32 slides into place in the now axially aligned axially extending clip receiving surface 285 of the cap member 28 and the radially inwardly extending slot 29 of the fitting 20.

When the device 10 is to be removed, the locking clip 32 is manually removed such as by lifting the clip 32 by the spine 345. The fitting 20 can then be unscrewed from the cap member 28 and fitting 20 with components 22, 24 and 26 removed. It will be appreciated that a substitute fitting 20 can be paired with the existing cap member 28 and fastener push ring 30 when the original fitting 20 is removed. Further, once the fitting 20 is removed, the cap member 28 with fastener push ring 30 can be slid off of the swage pipe 19.

The disclosure may be embodied in other specific forms without departing from the spirit or essential characteristics thereof. The present embodiments are therefore to be considered in all respects as illustrative and not restrictive, the scope of the disclosure being indicated by the claims of the application rather than by the foregoing description, and all changes which come within the meaning and range of equivalency of the claims are therefore intended to be embraced therein.

The invention claimed is:

1. A device, comprising:
   a fitting body comprising an interior surface defining an interior cavity, wherein the interior surface comprises an axially inner portion, an axially outer portion, a first axially intermediate portion and a second axially intermediate portion,
   wherein the first axially intermediate portion extends from a ledge axially outwardly to a retaining nub, wherein the retaining nub extends radially inwardly from the first axially intermediate portion,
   wherein the second axially intermediate portion extends from the retaining nub axially outwardly to the axially outer portion, wherein the axially outer portion comprises a thread;
   at least one sealing ring maintained within the first axially intermediate portion;
   a fastening ring spreader maintained within the second axially intermediate portion;
   a retainer grip ring maintained within the axially outer portion;
   a cap member comprising a head formed with a body, wherein the body comprises a body interior surface and a body exterior surface, wherein the body exterior surface comprises an axially extending grip ring receiving surface; and
   a fastener push ring slidably engaged with the cap member body interior surface.

2. The device of claim 1, wherein the fastener push ring is engageable with the fastening ring spreader.

3. The device of claim 1, wherein the fitting body comprises an outer surface, wherein the fitting body is formed with a slot extending radially outwardly through the axially outer portion of the interior surface of the body and wherein the cap member body exterior surface further comprises an axially extending clip receiving surface.

4. The device of claim 3, further comprising a locking clip removably maintainable within the slot of the fining body outer surface and the axially extending clip receiving surface of the body exterior surface of the cap.

5. The device of claim 1, wherein the retainer grip ring is maintained within the axially extending grip ring receiving surface of the cap member.

6. The device of claim 1, wherein the cap member body interior surface forms an opening extending axially through the cap member along a cap axis, wherein the cap member body interior surface comprises a primary axial segment and a secondary axial segment, wherein the fastener push ring is slidably engageable with the primary axial segment of the body interior surface.

7. The device of claim 6, wherein the primary axial segment extends radially outwardly from the cap axis less than the secondary axial segment extends radially outwardly from the cap axis.

8. The device of claim 1, wherein the fastener push ring comprises a forked leading edge, wherein the fastening ring spreader comprises a ring-shaped body and a plurality of lift surfaces extending axially outwardly from the body, wherein upon axial pressure being applied to the fastener push ring, the plurality of lift surfaces engage the forked leading edge of the fastener push ring and lift the forked leading edge radially outwardly.

9. The device of claim 1, wherein the fastening ring spreader is formed with a latch extension extending axially outwardly from an axially outer face of the fastener push ring.

10. The device of claim 9, wherein the latch extension is formed with a radially inner face and a radially outer face, wherein the radially inner face extends axially outwardly from the axially outer face and wherein the radially outer face extends axially outwardly and radially inwardly from the axially outer face.

11. A device, comprising:
   a fitting body comprising an interior surface defining a cavity extending axially through the fitting body, wherein the fitting body further comprises a first segment comprising an axially inner portion, an axially outer portion and first and second axially intermediate portions, wherein the axially inner portion comprises an axially inner portion radial depth, wherein the fitting body interior surface comprises a tube stop separating the first segment of the fitting body from a second segment, wherein the second segment comprises a second segment axially inner portion comprising a second segment axially inner portion radial depth that is less than the axially inner portion radial depth of the first segment, and wherein the second segment further comprises a second segment axially intermediate segment comprising a second segment axially intermediate radial depth that is less than a first axially intermediate portion radial depth of the first axially intermediate portion of the first segment, wherein the first axially intermediate portion comprises a ledge extending radially outwardly from the axially inner portion, a sealing ring engaging floor extending axially outwardly from the ledge and a retaining nub extending radially inwardly from the sealing ring engaging floor to a plateau, wherein the plateau comprises a plateau radial depth equal to or less than the axially inner portion radial depth, wherein the second axially intermediate portion extends axially outwardly from the retaining nub to the axially outer portion, wherein the exterior surface is formed with a slot extending radially outwardly through the axially outer portion of the interior surface of the body.

12. The device of claim 11, wherein the first axially intermediate portion comprises a first axially intermediate portion radial depth, wherein the second axially intermediate portion comprises a second axially intermediate portion radial depth, and wherein the second axially intermediate portion radial depth is greater than the first axially intermediate portion radial depth.

13. The device of claim 12, wherein the first axially intermediate portion radial depth is greater than the axially inner portion radial depth.

* * * * *